United States Patent [19]
Sugiura

[11] Patent Number: 5,834,865
[45] Date of Patent: Nov. 10, 1998

[54] HYBRID STEPPING MOTOR

[75] Inventor: Tsuneo Sugiura, Nagano-ken, Japan

[73] Assignee: Tamagawa Seiki Kabushiki Kaisha, Nagano-ken, Japan

[21] Appl. No.: 722,843

[22] Filed: Sep. 26, 1996

[30] Foreign Application Priority Data

Jun. 3, 1996 [JP] Japan .................................. 8-140383

[51] Int. Cl.$^6$ .................................................. H02K 37/00
[52] U.S. Cl. ..................... 310/49 R; 310/67 R; 310/164; 310/112; 310/114
[58] Field of Search ............... 310/49 R, 67 R, 310/164, 112, 114

[56] References Cited

U.S. PATENT DOCUMENTS

| | | | |
|---|---|---|---|
| 3,671,841 | 6/1972 | Hoffmann | 318/696 |
| 4,127,802 | 11/1978 | Johnson | 318/696 |
| 4,501,980 | 2/1985 | Welburn | 310/12 |
| 4,952,859 | 8/1990 | Torisawa et al. | 318/696 |
| 4,963,775 | 10/1990 | Mori | 310/49 R |
| 5,289,066 | 2/1994 | Clark | 310/67 R |
| 5,506,458 | 4/1996 | Pace et al. | 310/67 R |

*Primary Examiner*—Steven L. Stephan
*Assistant Examiner*—Timothy A. Williams
*Attorney, Agent, or Firm*—Sughrue, Mion, Zinn, Macpeak & Seas, PLLC

[57] ABSTRACT

A hybrid stepping motor according to the present invention has coils wound on stator yokes arranged on a fixed shaft or coils arranged on the inner peripheral surface of stator yokes. For this reason, the coils can be easily formed, a coil mounting density higher than that by a conventional technique can be obtained, and cost reduction can be obtained. An auxiliary magnetic plate and an auxiliary magnet are arranged on both the sides of a stator yoke member to form magnetic circuits at both the ends of the stator yoke member. Therefore, motors having various numbers of phases can be obtained, and a core are partially or entirely constituted by a non-layered structure, thereby improving torque/current characteristics.

31 Claims, 32 Drawing Sheets

< GRAPH 1 >

N1 POLE $r_1(\theta) = r_o - r_m \cos\theta$        —(1—1)

N2 POLE $r_2(\theta) = r_o - r_m \cos(\theta + \pi)$        —(1—2)

S1 POLE $r_3(\theta) = r_o - r_m \cos(\theta + \pi/2)$        —(1—3)

S2 POLE $r_4(\theta) = r_o - r_m \cos(\theta + 3\pi/2)$        —(1—4)

<GRAPH 2>

(TWO PHASE TYPE)

HYBRID STEPPING MOTOR

BACKGROUND OF THE INVENTION

1. Field of the Invention

The present invention relates to a hybrid stepping motor and, more particularly, to a novel improvement in which a coil mounting density is increased to obtain an inexpensive arrangement having high efficiency, thereby improving torque/current characteristics.

2. Description of the Related Art

As such a conventional hybrid stepping motor which has been used, as shown in FIG. 1, a rotating shaft 1 is rotatably arranged on a pair of bearings 2 and 3 arranged on both the sides of a casing 4. A stator yoke 6 having an annular shape as a whole and having a stator coil 5 is arranged on an inner surface 4a of the stator case 4, and a plurality of stator teeth 7 are formed at predetermined intervals on the inner surface of the stator yoke 6. First and second rotor yokes 9 and 10 each having an annular shape which are parallelly arranged in the axial direction through a magnet plate 8 are integrally arranged between the bearings 2 and 3, and a plurality of rotor teeth 9a and 10a are formed on the peripheral surfaces of the rotor yokes 9 and 10. The rotor yokes 9 and 10 are designed to have different polarities. Therefore, when a drive pulse is supplied to the stator coil 5 through a drive circuit (not shown), the step rotation of the rotor yokes 9 and 10 can be obtained.

Since the conventional hybrid stepping motor is arranged as described above, the following problems are posed.

More specifically, in a stepping motor having the above hybrid structure in which the magnet plate is interposed between the rotor yoke, since the stator coil wound on the teeth of the stator yoke is located inside the casing, the coil cannot be easily wound on the teeth, and the density of coil winding cannot be easily increased. In addition, sufficient torque/current characteristics cannot be obtained.

SUMMARY OF THE INVENTION

The present invention has been made to solve the above problems, and has as its object to provide a hybrid stepping motor in which winding and attachment of a coil is facilitated, a coil mounting density is increased to improve efficiency and reducing cost, and torque/current characteristics are improved.

In a hybrid stepping motor according to the present invention, one or both of a rotor and a stator is partially or entirely constituted by a non-layered core to reduce a magnetic resistance in the plate-thickness direction of the rotor or stator, reduce a detente torque in an OFF state, reduce the difference between generation torques of magnetized phases, and increase (torque/current ratio) in an ON state, thereby smoothly rotating the stepping motor. A coil is arranged on the outer periphery or inner side of the core to facilitate coil winding and coil attachment.

DESCRIPTION OF THE PREFERRED EMBODIMENT

Figure 1:
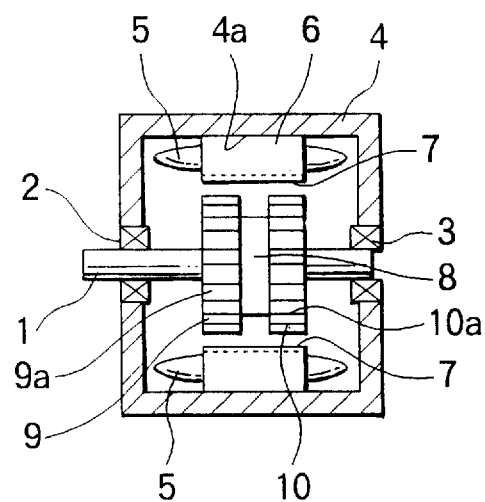
FIG. 1 is a sectional view showing a conventional hybrid stepping motor.

A preferred embodiment of a hybrid stepping motor according to the present invention will be described below with reference to the accompanying drawings. The same reference numerals as in the prior art denote the same parts in this embodiment.

Figure 2:
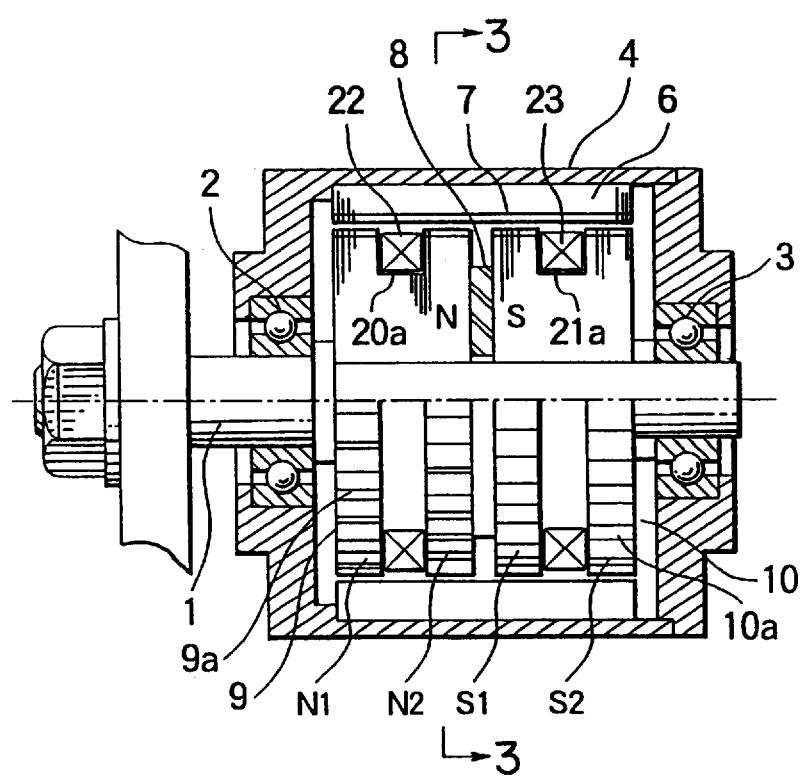
FIG. 2 is a sectional view showing a two-phase hybrid stepping motor of an outer-rotor type according to the present invention.
Figure 3:
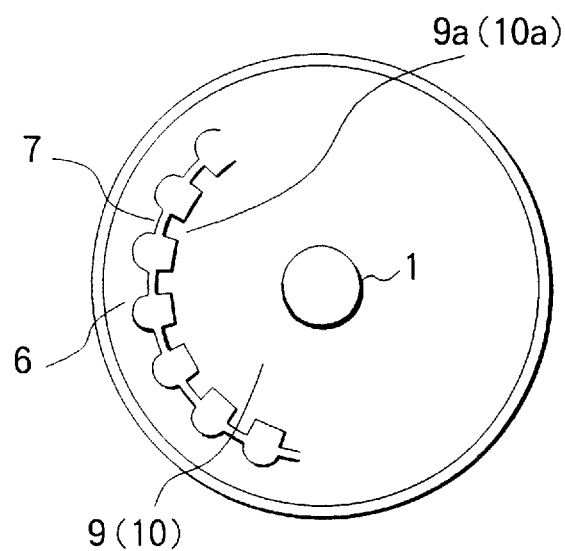
FIG. 3 is a side sectional view showing the hybrid stepping motor along 3—3 in FIG. 2.

FIG. 2 shows a hybrid stepping motor having an outer-rotor arrangement. Referring to FIG. 2, reference numeral 1 denotes a fixed shaft consisting of a non-magnetic material. A stator case 4 having an annular shape as a whole is rotatably arranged on a pair of bearings 2 and 3 spaced apart from the fixed shaft 1. An annular rotor yoke 6 having an annular shape and a plurality of rotor teeth 7 is arranged on the inner surface of the stator case 4.

First and second annular stator yokes 9 and 10 which are parallelly arranged on the fixed shaft 1 in the axial direction through a magnet plate 8 are integrated with each other to interpose the magnet plate 8 therebetween, and first and second coil receiving grooves 20a and 21a are formed at the central and outer peripheral positions of the stator yokes 9 and 10 in the axial direction, respectively. A first coil 22 and a second coil 23 which are wound like bobbins are arranged in the coil receiving grooves 20a and 21a (note that the coils 22 and 23 are automatically wound by a winding machine). First and second N-poles N1 and N2 are formed on the outer peripheral surface of the first stator yoke 9 to interpose the first coil 22, and first and second S-poles S1 and S2 are formed on the outer peripheral surface of the second stator yoke 10 to interpose the second coil 23. The poles N1, N2, S1, and S2 correspond to the rotor teeth 7, respectively, and a plurality of stator teeth 9a and 10a having the same pitch as that of the rotor teeth 7 are formed on the outer peripheral surfaces of the poles N1, N2, S1, and S2. As shown in the operation view in FIG. 6, the stator teeth 9a and 10a are formed in the poles N1 and N2 such that the stator teeth 9a are shifted from the stator teeth 10a by ½ pitches, and the stator teeth 9a and 10a are formed in the poles S1 and S2 such that the stator teeth 9a are shifted from the stator teeth 10a by ½ pitches. The stator teeth 9a and 10a in the N-poles N1 and N2 and the stator teeth 9a and 10a in the S-poles S1 and S2 are formed to be shifted by ¼ pitches.

Figure 4:
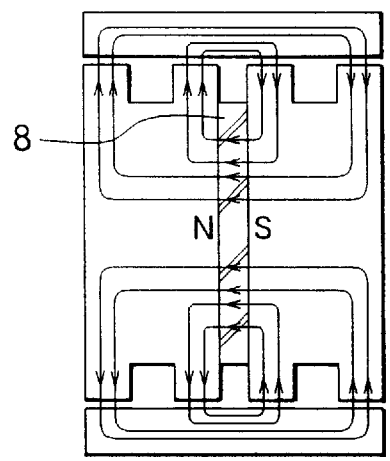
FIG. 4 is a view for explaining the flows of magnetic fluxes formed by magnet plates.
Figure 5:
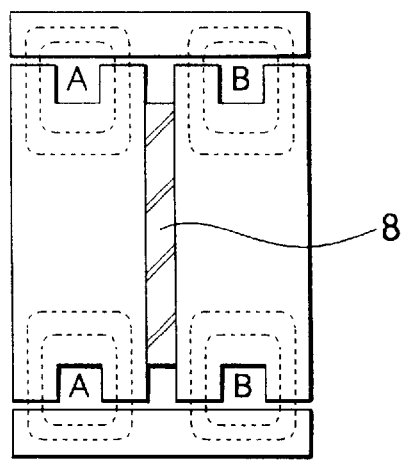
FIG. 5 is a view for explaining the flows of magnetic fluxes formed by coils.
Figure 6:
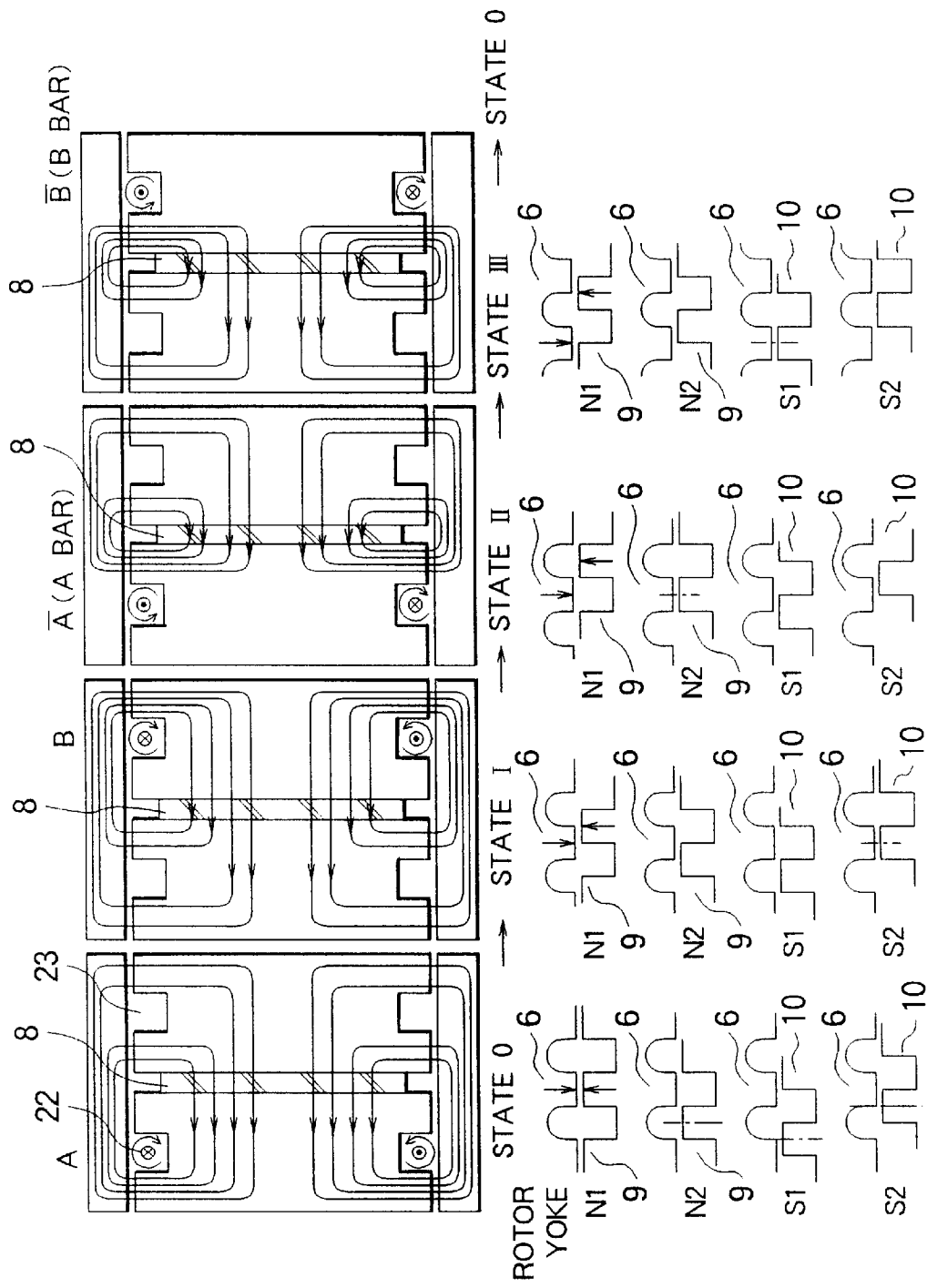
FIG. 6 is a view for explaining synthetic magnetic fluxes and step rotation of a rotor yoke when a current flows in magnet plates and coils.

An operation of the hybrid stepping motor will be described below. FIG. 4 shows the flows of magnetic fluxes formed by the magnet plate 8, FIG. 5 shows the flows of magnetic fluxes formed by the first and second coils 22 and 23. The directions of the magnetic fluxes depend on the directions of currents flowing in the coils 22 and 23. As shown in FIG. 6, when currents having directions indicated by A and B flow from a drive circuit (not shown) into the first and second coils arranged through the magnet plate 8, the rotor yoke 6 is rotated from state 0 to state 1 by a known magnetic function. When currents having direction indicated by A/ and B/ flow from the drive circuit into the coils 22 and 23, the rotor yoke 6 is rotated as shown in state II and state III. Thereafter, the rotor yoke 6 is located at the position of state 0. As a result, the rotor yoke 6 is stepping-rotated by 1 pitch of the rotor teeth 7.

Figure 7:
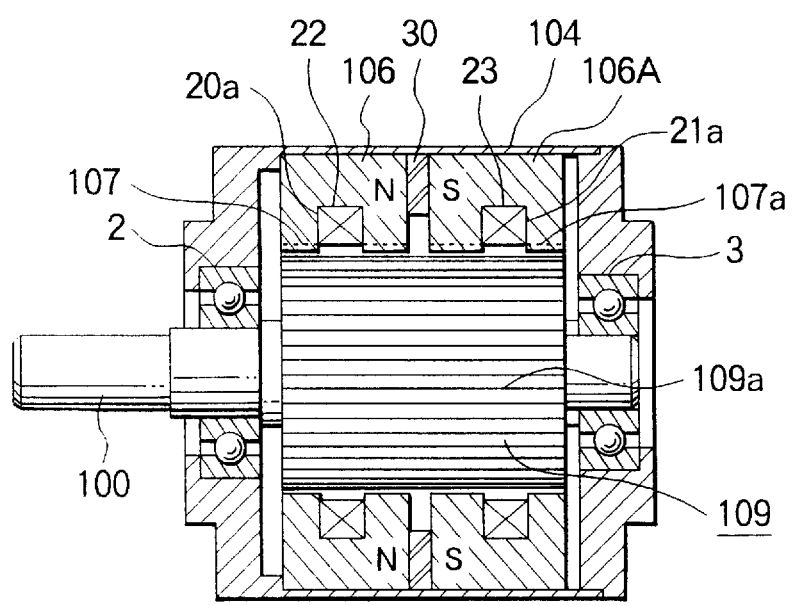
FIG. 7 is a sectional view showing another example of FIG. 2.

FIG. 7 shows a case wherein a hybrid stepping motor having an inner-rotor arrangement which is conventional used and shown in FIG. 1 is applied as in the arrangement of the present invention to constitute an inner-rotor type hybrid stepping motor. Referring to FIG. 7, first and second stator yokes 106 and 106A which are integrated with each other in the axial direction through an annular magnet plate 30 are arranged on the inner surface of a stator case 104 consisting of a non-magnetic material, and the stator yokes 106 and 106A are designed to have different polarities. First and second bobbin-like coils 22 and 23 are arranged in receiving grooves 20a and 21a of the stator yokes 106 and 106A, respectively, and a plurality of rotor teeth 109a are formed on the outer peripheral surface of the rotor yoke 109. Therefore, the arrangement in FIG. 7 is of an inner-rotor type which is reverse to the type of the arrangement in FIG. 2. The stepping states of the hybrid stepping motor are obtained by the same principle as that of the operations shown in FIGS. 4 and 6. Although the coils 22 and 23 are described on the assumption that known bipolar winding is used, even if known unipolar winding is used, the same function as described above can be obtained. Although the stepping motor is driven by 1-phase magnetization as described above, the stepping motor may be driven by 2-phase magnetization or 1-2-phase magnetization. The shifts in pitch of the teeth 7, 9a, 10a, 107, and 109a are relative. Even if the pitch of the teeth of any rotor is shifted, the same operation as described above can be obtained.

Figure 8:
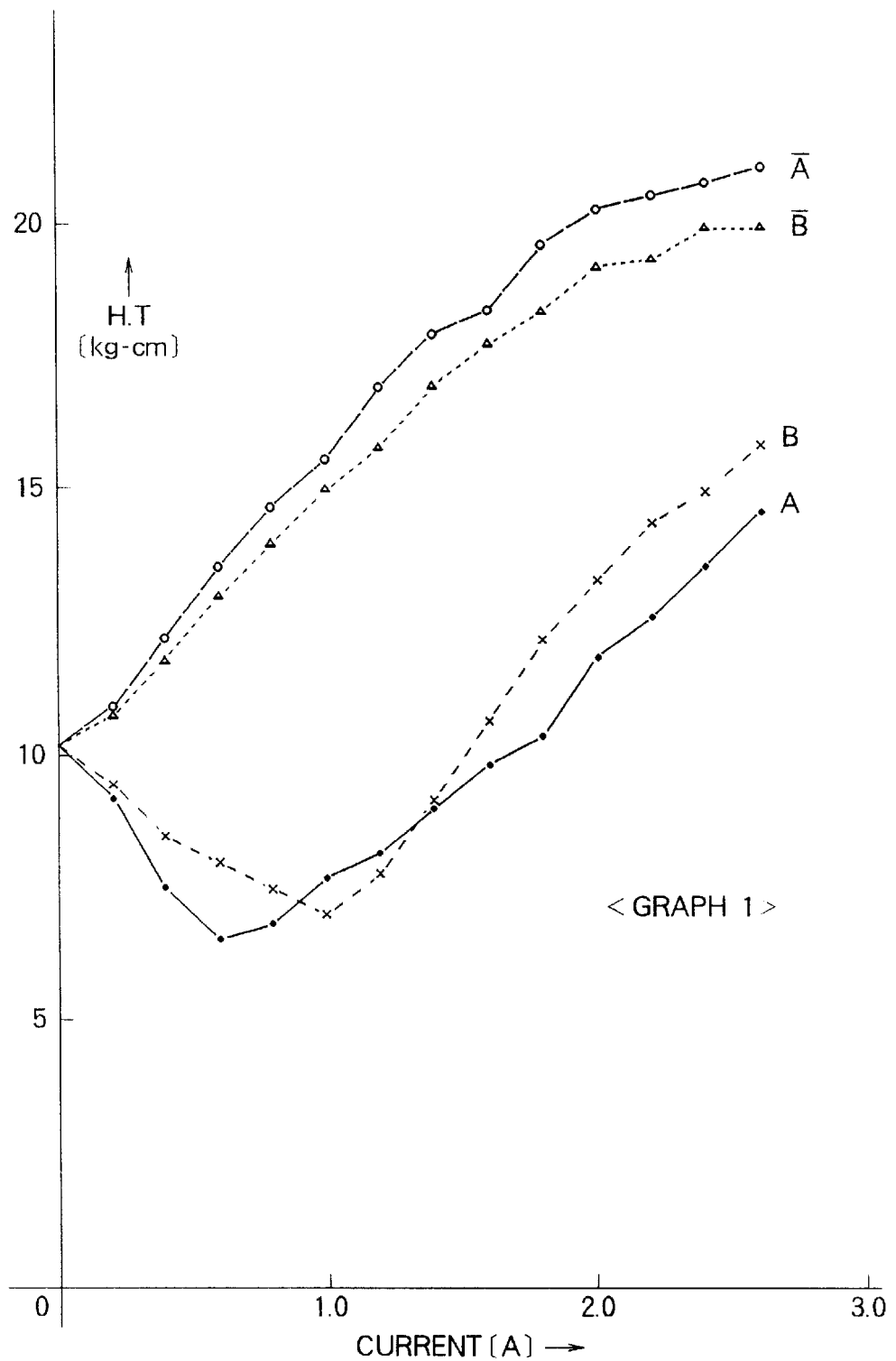
FIG. 8 is a graph showing a current and a holding torque in an ON state in each phase.
Figure 9:
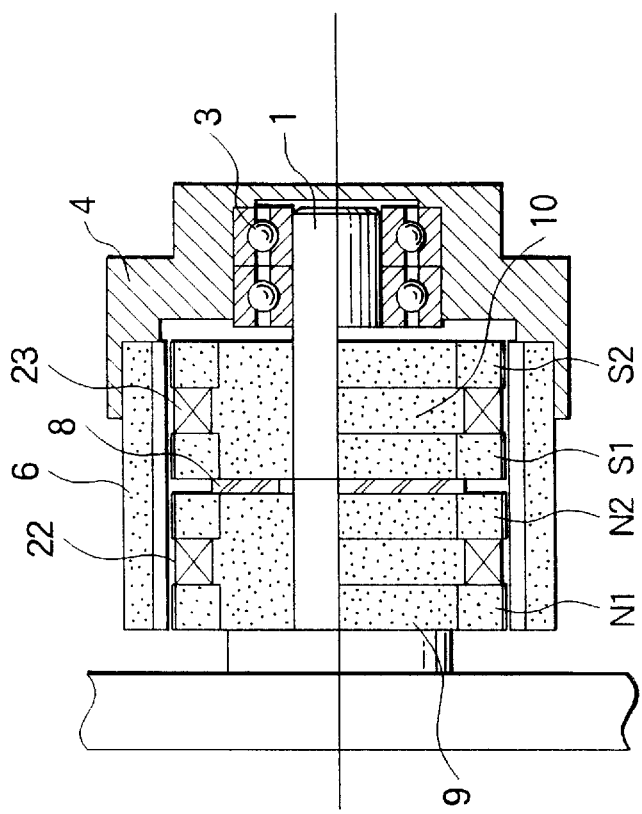
FIG. 9 is a sectional view showing the structure of a rotor and a stator in FIG. 2.

The annular rotor yoke 6 and stator yokes 9 and 10 in FIG. 2 may be constituted by a multilayered core obtained by stacking core elements each of which is generally formed by punching a silicon steel plate or may be constituted by a non-layered core consisting of a solid magnetic material. For example, in case of using a multilayered core, due to a magnetic resistance generated by a gap between cores of the multilayered core, when currents sequentially flow in order of A, B, A/, and B/ as indicated in graph 1 in FIG. 8, a detente torque at a current of 0 [A] increases, and a torque generated when A- or B-phase magnetization is performed is different from a torque generated when A/- or B/-phase magnetization is performed. For this reason, according to the present invention, as shown in FIG. 9, a part of the annular rotor yoke 6 and a part of the stator yokes 9 and 10 (Any of the yokes are indicated by dotted patterns, and portions other than the portion indicated by the dotted patterns are constituted by a multilayered core.) are constituted by an integrated non-layered core consisting of a solid magnetic material (these yokes may be entirely constituted by the integrated non-layered core).

Figure 10:
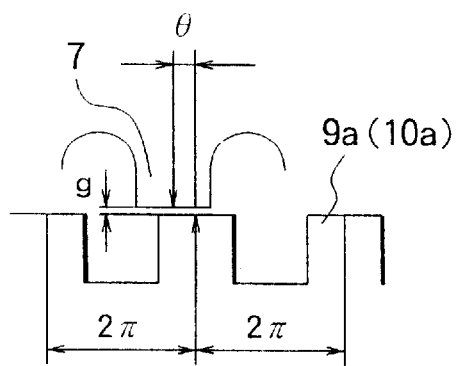
FIG. 10 is an enlarged view showing main parts in FIGS. 2 and 9.
Figure 11:
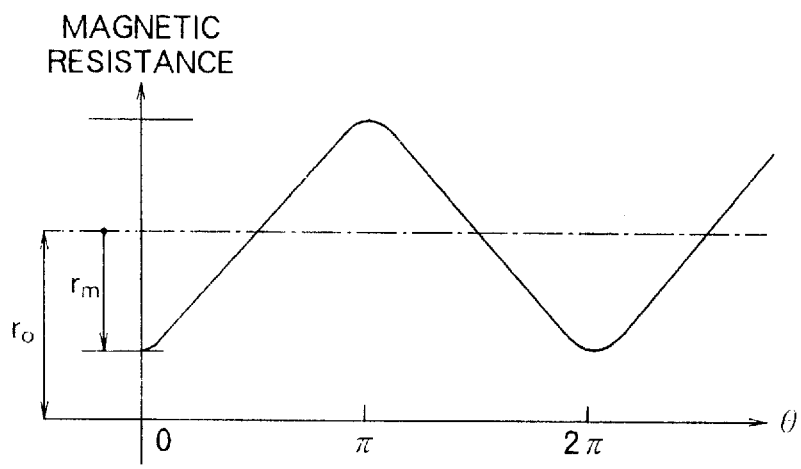
FIG. 11 is a graph showing magnetic characteristics in FIG. 10.

FIG. 10 shows a state in which the rotor teeth 7 oppose the stator teeth 9a (10a) through a gap g, and FIG. 11 shows a change in magnetic resistance between the rotor teeth and the stator teeth as a function of an angle θ (electrical angle) depending on rotation of the rotor yoke 6. In this case, when the angle and the changes in magnetic resistance in the poles are expressed by numerical equations with respect to a stationary wave portion and a fundamental wave portion, the following equations can be obtained. That is, equation 1-1 in FIG. 11 is obtained in the pole N1, and equation 1-2 in FIG. 11 is obtained in the pole N2 by shifting equation 1-1 by π.

Equations 1-3 and 1-4 in FIG. 11 are obtained in the poles S1 and S2 by shifting equation 1-1 by $\pi/2$ and $3\pi/2$, respectively.

Figure 12:
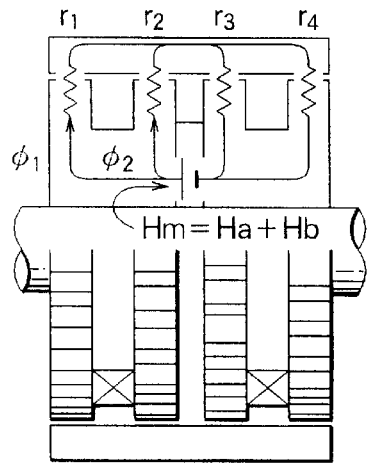
FIG. 12 is a view showing an arrangement equivalent to the arrangement in FIGS. 2 and 9.

A magnetic loop other than the gap g is constituted by a magnetic material (iron). If the magnetic resistance is neglected, the equivalent circuit of the magnetic loop shown in FIG. 12 can be obtained. In this case, Hm is a magnetomotive force generated by the magnet plate 8, and is conveniently defined as Ha for $\gamma_1$ and $\gamma_2$ and as Hb for $\gamma_3$ and $\gamma_4$. As is apparent from FIG. 11 and equations (1-1) to (1-4) in FIG. 11, a magnetic resistance $\gamma_1$ ($\theta$) of the pole N1 is minimum, and a magnetic flux passing through the pole N1 is maximum when $\theta=0$. When the magnetic resistances of the poles at this time, and when $\theta=0$, equations: $\gamma_1(0)=\gamma_1-\gamma_m$, $\gamma_3=\gamma_4=\gamma_0$, and $\gamma_2=\gamma_0+\gamma_m$ are obtained. Similarly, a magnetic flux $\phi_2$ is maximum when $\theta=\pi$, and equations: $\gamma_2(\pi)=\gamma_0-\gamma_m$, $\gamma_3=\gamma_4=\gamma_0$, and $\gamma_1=\gamma_0+\gamma_m$ are obtained. For this reason, $\phi_{1max}=\phi_{2max}=Ha/(\gamma_0-\gamma_m)$ is satisfied, and a change in angle is kept symmetrical. This means that the characteristics of an A phase ($\gamma_1$, $\phi_{1max}$ side) coincide with the characteristics of an A/ phase ($\gamma_2$, $\phi_{2max}$ side). This does not match the substance in FIG. 8.

Figure 13:
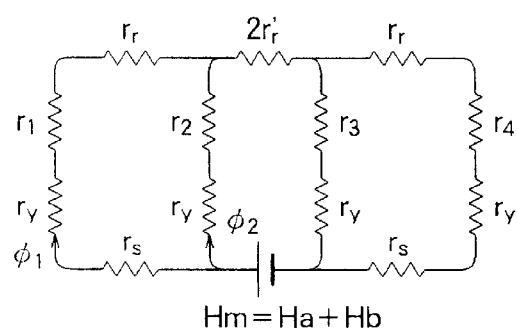
FIG. 13 is an equivalent circuit diagram obtained in consideration of a magnetic resistance other than the magnetic resistance of a gap in FIG. 12.

Therefore, in consideration of a magnetic resistance other than the magnetic resistance of the gap g, an equivalent circuit shown in FIG. 13 is obtained. In FIG. 13, it is assumed that $\gamma_s$ is the resistance (i.e., the magnetic resistance of a multilayered core) of a component in the axial direction in the stator yokes 9 and 10, that $\gamma_r$ and $\gamma'_r$ are the resistances of components in the axial direction of the annular rotor yoke 6, and that $\gamma_y$ is the resistance in a component in a radial direction in the stator yokes 9 and 10. In this case, as in the above description, when $\phi_{1max}$ and $\phi_{2max}$ are calculated, the following equations can be obtained:

$$\phi_{1max}=Ha/(\gamma_0-\gamma_m+\gamma_y+\gamma'_r+\gamma_s+\gamma_r) \qquad 2$$

$$\phi_{2max}=Ha/(\gamma_0-\gamma_m+\gamma_y+\gamma'_r) \qquad 3$$

In this case, to find the difference between the A phase and the A/ phase, $\phi_{2max}/\phi_{1max}$ is calculated, the following equation can be obtained:

$$\phi_{2max}/\phi_{1max}=1+(\gamma_s+\gamma_r)/(\gamma_0-\gamma_m+\gamma_y+\gamma'_r) \qquad 4$$

Figure 14:
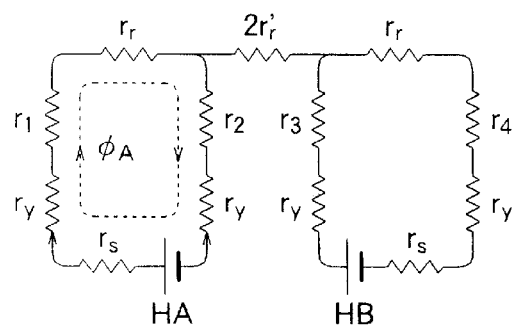
FIG. 14 is an equivalent circuit diagram obtained when viewed from a magnetomotive force generated by a coil in the equivalent circuit in FIG. 13.

In equation 4, when the second term of the left-hand side is minimized, $\phi_{1m}=\phi_{2m}$ is satisfied, i.e., the characteristics of the A phase coincide with the characteristics of the A/ phase. Therefore, it is an important index on a concrete design that the numerator ($\gamma_s+\gamma_r$) is decreased and the denominator ($\gamma_0-\gamma_m+\gamma_y+\gamma'_r$) is increased. The denominator can be increased by extending the gap g or increasing the resistance in the radial direction. On the other hand, in order to cause a magnetomotive force ($H_A$ in FIG. 14) generated by the coils 22 and 23 to effectively act, the annular resistance in the $\phi_A$ direction in the magnetic circuit in FIG. 14 is desirably decreased as much as possible. For this reason, an increase in denominator is disadvantageous. As a result, it is a concrete measure that the denominator ($\gamma_s+\gamma_r$) is minimized. Therefore, $\gamma_s$ and $\gamma_r$ are magnetic resistances in the plate thickness direction when the multilayered core is used, and the resistances of voids in the multilayered core are accumulated. For this reason, since the resistance becomes a large value which cannot be neglected, as shown in FIG. 9, the annular rotor yoke 6 consisting of a solid magnetic material free from any void and the stator yokes 9 and 10 which partially consist of a solid magnetic material decrease the magnetic resistances $\gamma_s$ and $\gamma_r$.

Figure 15:
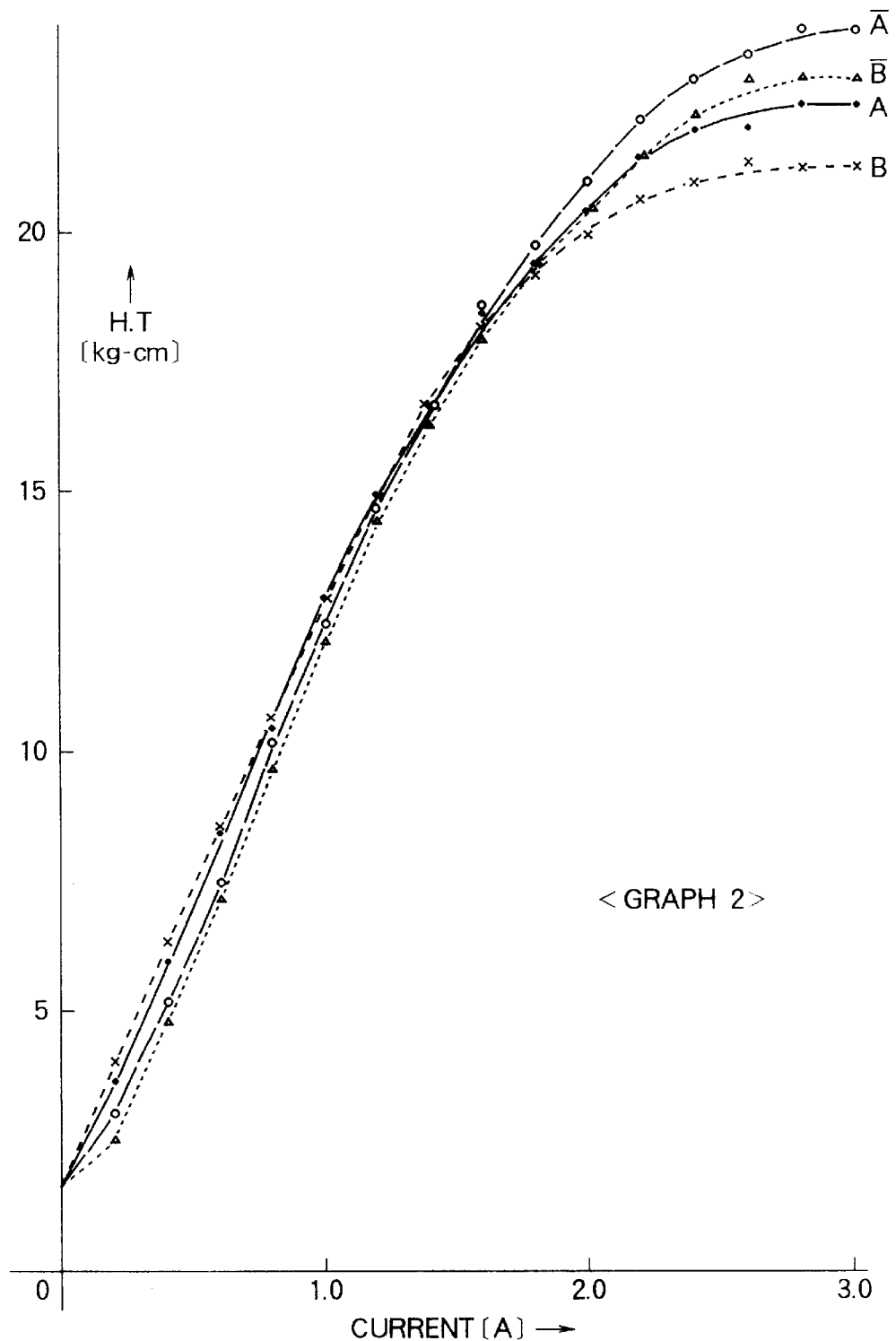
FIG. 15 is a graph showing a state wherein the characteristics in FIG. 2 is improved into the characteristics in FIG. 9.

The magnetic resistance ($\gamma_0-\gamma_m$) generated by the gap g in the denominator is basically dependent on the length of the gap g. The length of the gap g is 0.1 mm or less, the magnetic resistances $\gamma_s$ and $\gamma_r$ between cores of the multilayered core is not sufficiently smaller than the resistance of the gap g. Therefore, on the magnetic circuit, when one or both of the annular rotor yoke 6 serving as the component in the axial direction of the magnetic resistance and the stator yokes 9 and 10 are partially or entirely constituted by a non-layered core (constituted by an integrated solid magnetic material) to reduce the magnetic resistance, as shown in graph 2 in FIG. 15, a detente torque HT in a 0 state in which no currents flow in the A phase, B phase, A/ phase, and B/ phase becomes considerably smaller than that when the multilayered core is used. The correlative differences between the phase currents and holding torque characteristics decrease, and the torque uniformly increase in proportion to the current. The magnetic resistances ($\gamma_r$ and $\gamma_s$ shown in FIG. 14) when viewed from the coils 22 and 23 decrease, and the torque/current characteristics become considerably good as shown in graph 2 in FIG. 15.

In the above description, the arrangement in FIG. 2 is constituted as in FIG. 9. However, in the arrangement in FIG. 7, when one or both of the annular stator yokes 106 and 106A and the rotor yoke 109 are partially or entirely constituted by the non-layered coil, as described above, the magnetic resistance in the axial direction is decreased, and the same preferable driving state as described above can be obtained.

Figure 16:
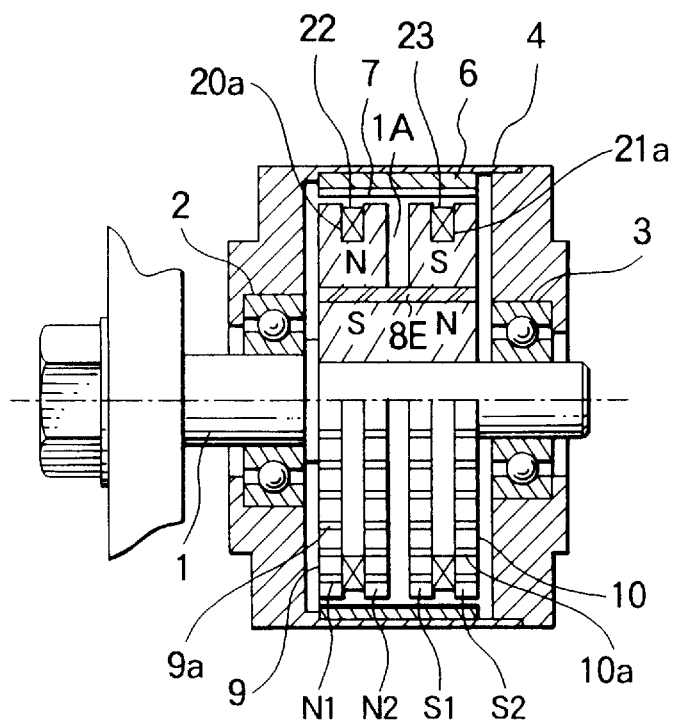
FIG. 16 is a sectional view showing still another example of FIG. 2.

As another embodiment of the arrangement in FIG. 2, an arrangement shown in FIG. 16 can be used. The same reference numerals as in FIG. 2 denote the same parts in FIG. 16.

Reference numeral 1 in FIG. 16 denotes a fixed shaft consisting of a magnetic material, a rotor case 4 having an annular shape as a whole is rotatably arranged on a pair of bearings 2 and 3 spaced apart from the fixed shaft 1. An annular rotor yoke 6 having a plurality of rotor teeth 7 is arranged on the inner surface of the rotor case 4.

First and second annular stator yokes 9 and 10 which are parallelly arranged in the axial direction through a void 1A are arranged in a magnet cylindrical member 8E arranged around the fixed shaft 1, and the stator yokes 9 and 10 are integrated with each other such that the stator yokes 9 and 10 are fitted on the outer peripheral surface of the magnet cylindrical member 8E.

First and second coil receiving grooves 20a and 21a are formed at the central and outer peripheral positions of the stator yokes 9 and 10 in the axial direction. First and second coils 22 and 23 wound like bobbins are arranged in the coil receiving grooves 20a and 21a by automatic winding or the like by a winding machine. First and second annular N-poles N1 and N2 are formed on the outer peripheral surface of the first stator yoke 9 to interpose the first coil 22, and first and second annular S-poles S1 and S2 are formed on the outer peripheral surface of the second stator yoke 10 to interpose the second coil 23. The poles N1, N2, S1, and S2 correspond to the rotor teeth 7, respectively, and a plurality of stator teeth 9a and 10a having the same pitch as that of the rotor teeth 7 are formed on the outer peripheral surfaces of the poles N1, N2, S1, and S2. The stator teeth 9a and 10a are formed in the poles N1 and N2 such that the stator teeth 9a are shifted from the stator teeth 10a by ½ pitches, and the stator teeth 9a and 10a are formed in the poles S1 and S2 such that the stator teeth 9a are shifted from the stator teeth 10a by ½ pitches. The stator teeth 9a and 10a in the N-poles N1 and N2 and the stator teeth 9a and 10a in the S-poles S1 and S2 are formed to be shifted by ¼ pitches.

Therefore, as in the arrangement in FIG. 16, one or both of the rotor yoke 6 and the annular stator yokes 9 and 10 are partially or entirely constituted by the non-layered core, the magnetic resistance in the axial direction can be decreased, and the preferable driving state which is the same as described above can be obtained.

Figure 17:
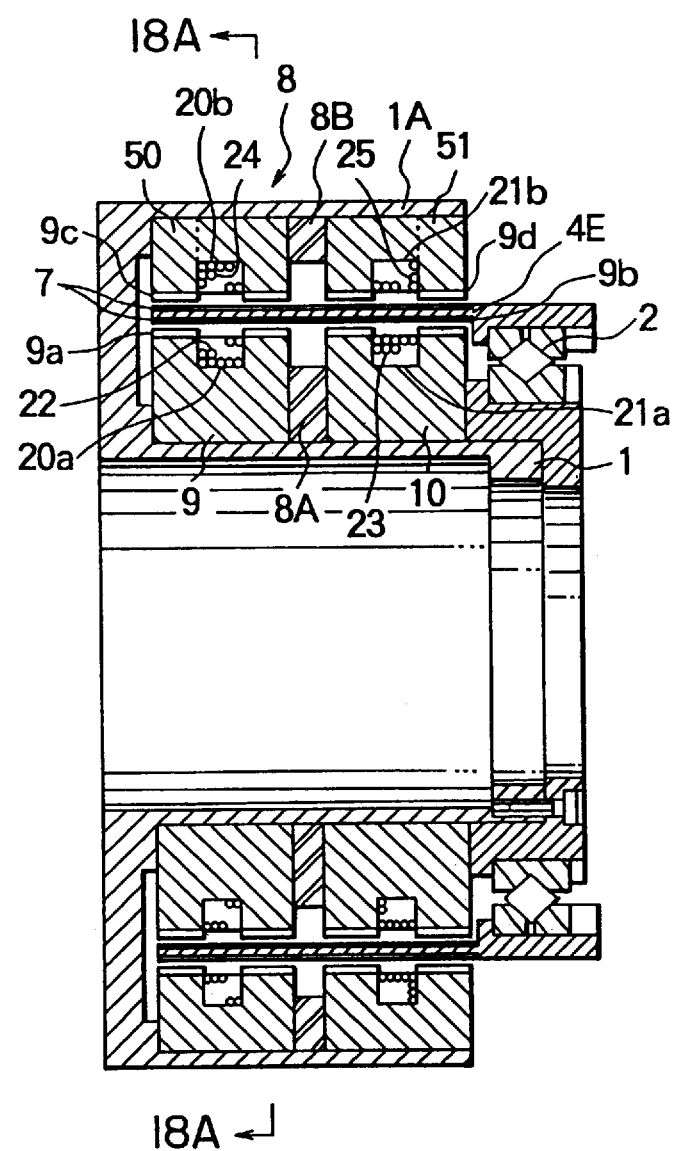
FIG. 17 is a sectional view showing still another example of FIG. 2.

As still another embodiment of the arrangement in FIG. 2, the arrangement shown in FIG. 17 can be used. The same reference numerals as in FIG. 2 denote the same parts in FIG. 17.

Figure 18:
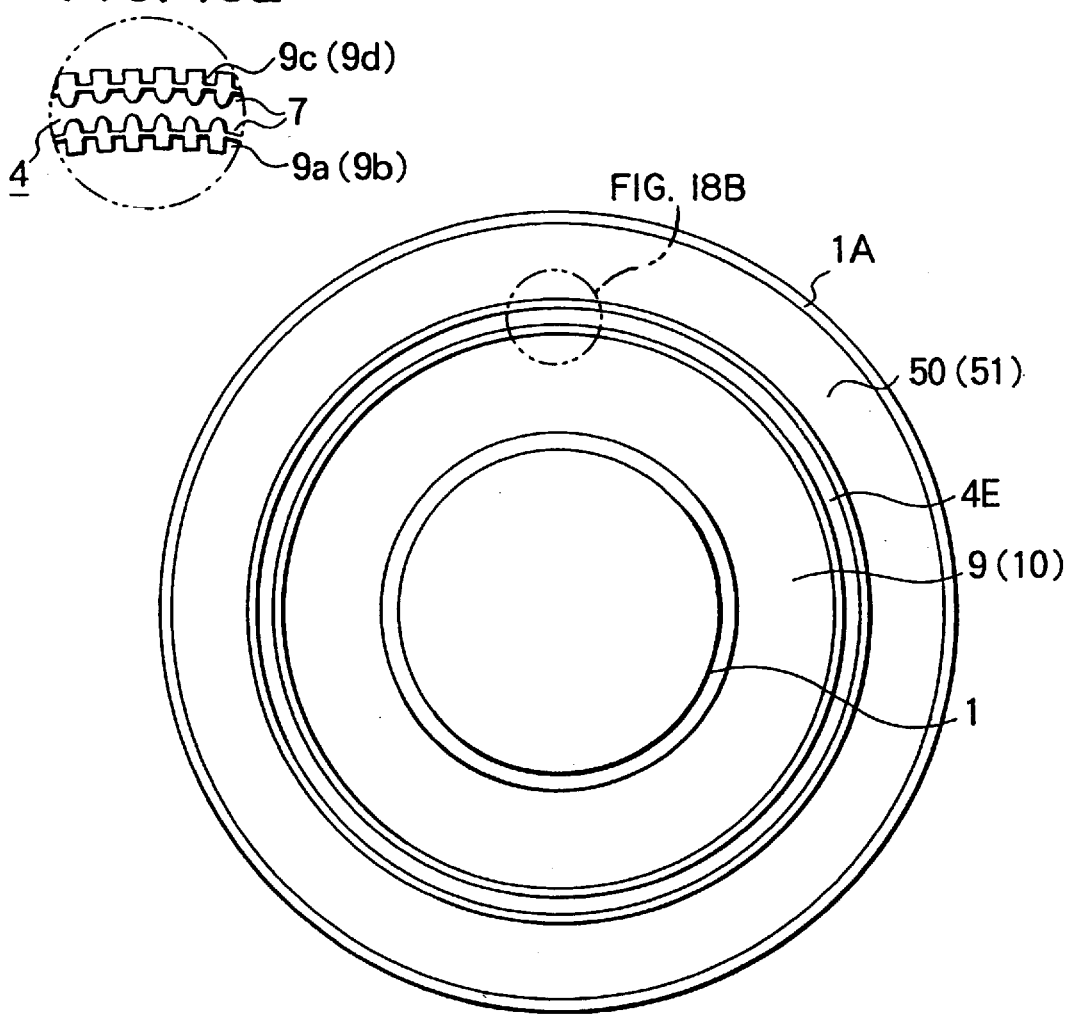
FIG. 18A is a sectional view showing the hybrid stepping motor along 18A—18A in FIG. 17.
FIG. 18B shows detail of FIG. 18A.

Reference numeral 1 in FIG. 17 denotes a hollow fixed shaft consisting of a non-magnetic material. A cylindrical rotor 4E having an annular shape as a whole is rotatably arranged on a bearing 2 formed on the fixed shaft 1. A plurality of rotor teeth 7 shown in FIG. 18B are formed on the inner and outer peripheral surfaces of the rotor 4E.

First and second annular stator yokes 9 and 10 which are parallelly arranged in the axial direction through first and second magnets 8A and 8B constituting a magnet plate 8 are integrated with each other on the fixed shaft 1 to interpose the magnet plate 8. First and second coil receiving grooves 20a and 21a are formed at the central and outer peripheral positions of the stator yokes 9 and 10 in the axial direction. First and second annular coils 22 and 23 bobbin-wound like bobbins are arranged in the coil receiving grooves 20a and 21a (note that the coils 22 and 23 are automatically wound by a winding machine). First and second annular N-poles N1 and N2 are formed on the outer peripheral surface of the first stator yoke 9 to interpose the first coil 22, and first and second annular S-poles S1 and S2 are formed on the outer peripheral surface of the second stator yoke 10 to interpose the second coil 23. The poles N1, N2, S1, and S2 correspond to the rotor teeth 7, respectively, and a plurality of stator teeth 9a and 10a having the same pitch as that of the rotor teeth 7 are formed on the outer peripheral surfaces of the poles N1, N2, S1, and S2. The stator teeth 9a and 10a are formed in the poles N1 and N2 such that the stator teeth 9a are shifted from the stator teeth 10a by ½ pitches, and the stator teeth 9a and 10a are formed in the poles S1 and S2 such that the stator teeth 9a are shifted from the stator teeth 10a by ½ pitches. The stator teeth 9a and 10a in the N-poles N1 and N2 and the stator teeth 9a and 10a in the S-poles S1 and S2 are formed to be shifted by ¼ pitches.

The fixed shaft 1 has an outer wall 1A which is formed at the outer peripheral position to have a L-shaped section. First and second outer stator yokes 50 and 51 similar to the inner stator yokes 9 and 10 are arranged on the outer wall 1A, and, as in the inner stator yokes 9 and 10, third and fourth coil receiving grooves 20b and 21b, third and fourth coils 24 and 25, and stator teeth 9c and 9d are formed on the inner side of the outer stator yokes 50 and 51.

Therefore, as in the arrangement in FIG. 17, one or both of the cylindrical rotor 4E and the stator yokes 9, 10, 50, and 51 are partially or entirely constituted by the non-layered core, the magnetic resistance in the axial direction can be decreased, and the preferable driving state which is the same as described above can be obtained.

As still another embodiment of the arrangement in FIG. 2, the arrangements shown in FIG. 19 to 27 can be used. The same reference numerals as in FIG. 2 denote the same parts in FIGS. 19 to 27.

Figure 19:
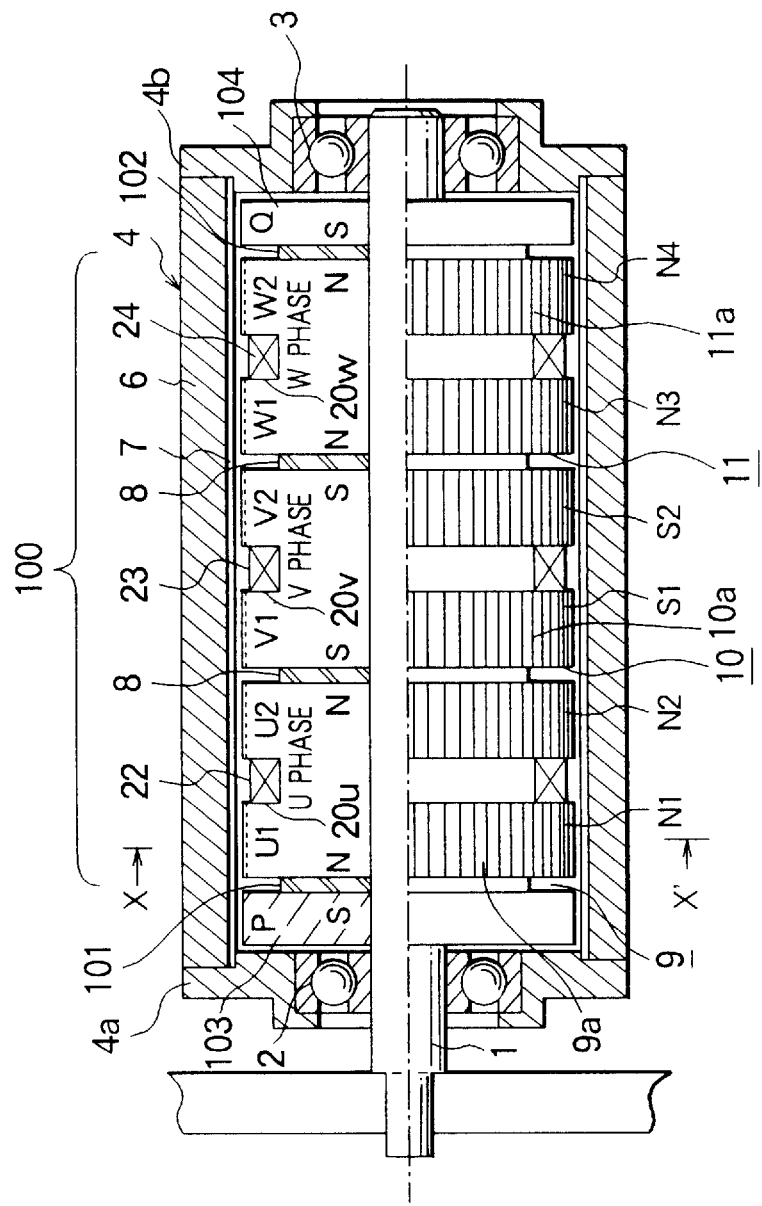
FIG. 19 is a half-sectional view showing still another example of FIG. 2.

FIG. 19 shows a hybrid stepping motor having an outer-rotor arrangement. Reference numeral 1 in FIG. 19 denotes a fixed shaft consisting of a non-magnetic material. A rotor case 4 constituted by a front lid 4a, a rear lid 4b, and a cylindrical rotor yoke 6 is rotatably arranged on bearings 2 and 3 spaced apart from the fixed shaft 1. A plurality of rotor teeth 7 are formed on the inner surface of the rotor yoke 6 of the rotor case 4.

First, second, and third annular stator yokes 9, 10, and 11 which are parallelly arranged in the axial direction through magnet plates 8 are integrated with each other on the fixed shaft 1 to interpose the magnet plates 8. First, second, and third coil receiving grooves 20u, 20v, and 20w are formed at the central and outer peripheral positions of the stator yokes 9, 10, and 11 in the axial direction. The stator yokes 9 to 11 constitute a stator yoke 100, and, on both the sides of the stator yoke member 100, first and second auxiliary magnetic plates 103 and 104 are fixed on the fixed shaft 1 through auxiliary magnet plates 101 and 102. A first U-phase coil 22, a second V-phase coil 23, and a third W-phase coil 24 which are wound like bobbins are arranged in the coil receiving grooves 20u, 20v, and 20w, respectively (note that the coils 22, 23, and 24 are automatically wound by a winding machine). First and second annular N-poles N1 and N2 are formed on the outer peripheral surface of the first stator yoke 9 to interpose the first coil 22, first and second annular S-poles S1 and S2 are formed on the outer peripheral surface of the second stator yoke 10 to interpose the second coil 23, and third and fourth annular N-poles N3 and N4 are formed on the outer peripheral surface of the third stator yoke 11 to interpose the third coil 24. The poles N1, N2, S1, S2, N3, and N4 correspond to the rotor teeth 7, respectively, and a plurality of stator teeth 9a, 10a, and 11a having the same pitch as that of the rotor teeth 7 are formed on the outer peripheral surfaces of the poles N1, N2, S1, S2, N3, and N4. The stator teeth 9a, 10a, and 11a are formed in the poles N1 and N2 such that the stator teeth 9a, 10a, and 11a are shifted from each other by ½ pitches (1π), the stator teeth 9a, 10a, and 11a are formed in the poles S1 and S2 such that the stator teeth 9a, 10a, and 11a are shifted from each other by ½ pitches (1π), and the stator teeth 9a, 10a, and 11a are formed in the poles N3 and N4 such that the stator teeth 9a, 10a, and 11a are shifted from each other by ½ pitches (1π). The stator teeth 9a, 10a, and 11a in the N-poles N1 and N2, the S-poles S1 and S2, and the N-poles N3 and N4 are formed to be shifted by ⅙ pitches (π/3) (½n pitches, n; the number of phases). The auxiliary magnetic plates 103 and 104 are only used to form magnetic flux paths.

Figure 20:
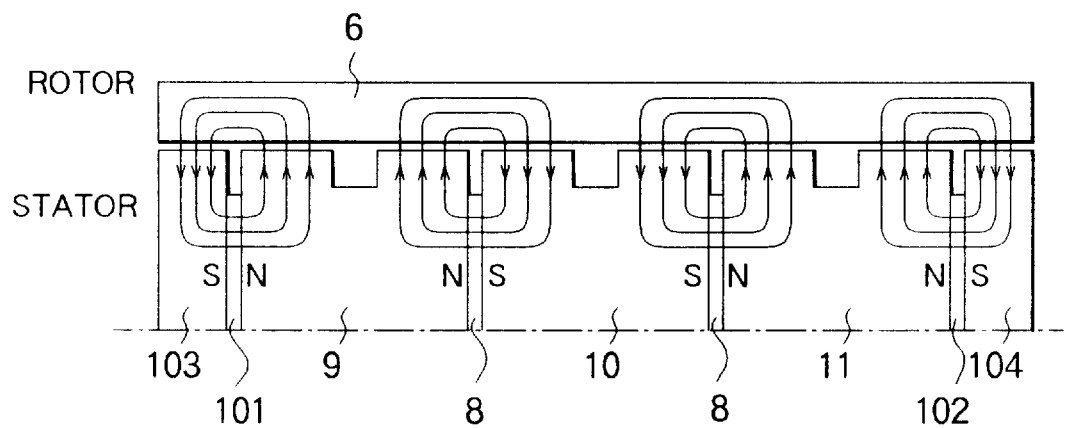
FIG. 20 is a view for explaining the flows of magnetic fluxes formed by the magnet plates in FIG. 19.
Figure 21:
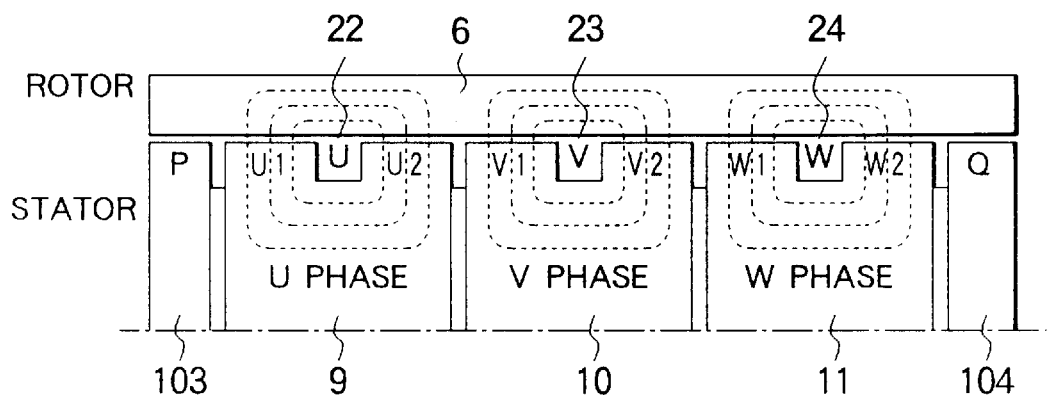
FIG. 21 is a view for explaining the flows of magnetic fluxes formed by the coils in FIG. 19.

An operation will be described below. FIG. 20 shows the flows of magnetic fluxes formed by the auxiliary magnet plates 101 and 102, and shows that the flows of the magnetic fluxes are equally divided by the first and second auxiliary magnetic plates 103 and 104. If there are no auxiliary magnet plates 101 and 102 and no auxiliary magnetic plates 103 and 104, the magnetic fluxes generated by the two magnets 8 are concentrated on the central V-phase stator yoke 10, and the magnetic fluxes are stronger (twice) than those of U and V phases on both the side of the stator yoke 10. For this reason, the uniformity of each phase is degraded. As a result, the motor is not established. For this reason, the functions of the auxiliary magnet plates and the auxiliary magnetic plates are important. Therefore, the uniformity of the magnetic fluxes is kept in a strong state. In addition, the uniformity of the magnetic flux of each phase can be kept by the auxiliary magnet plates. FIG. 21 shows magnetic fluxes generated by the U-, V-, and W-phase coils 22, 23, and 24. The directions of the flows of the magnetic fluxes are dependent on the directions of currents flows in the coils 22, 23, and 24, respectively.

Figure 22:
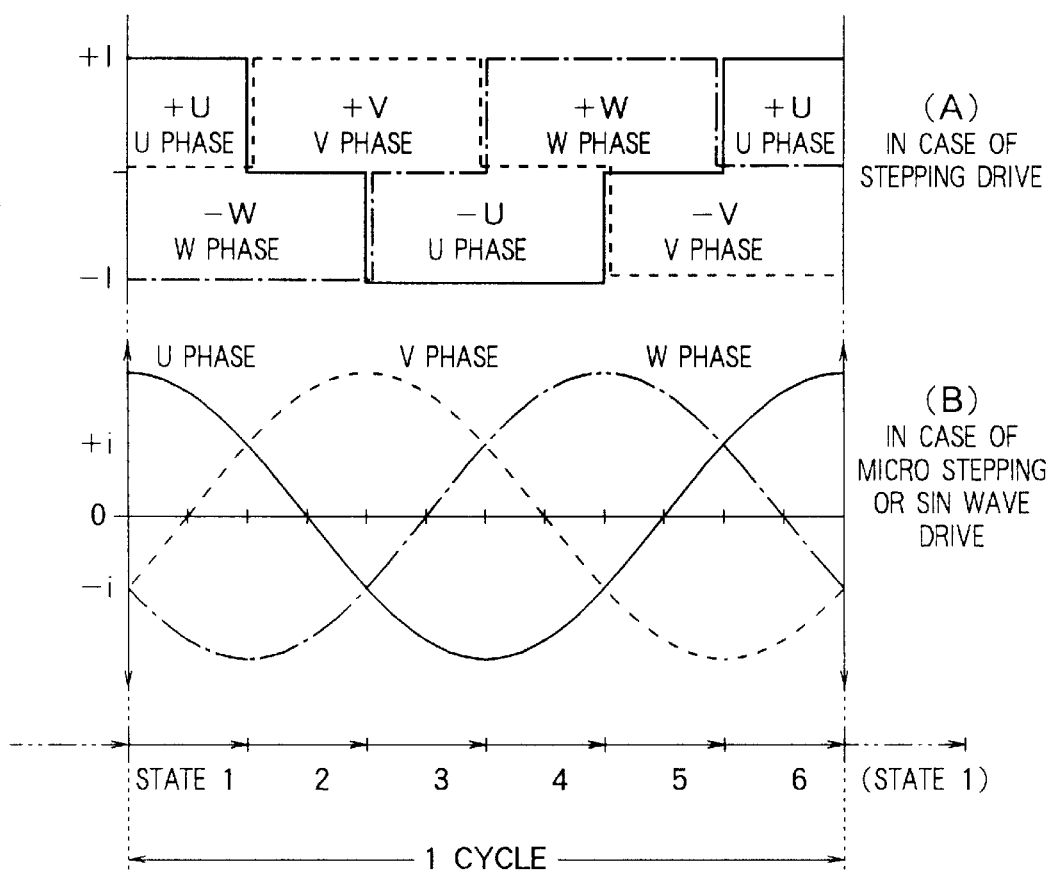
FIG. 22 is a view for explaining the driving states of the stepping motor in FIG. 19.

FIG. 22 shows a state wherein the coils 22, 23, and 24 are in an ON state. In FIG. 22, (A) shows step driving when the coils are turned on without changing the strength of a drive current I, and (B) shows known micro-step driving or sine-wave driving which is performed while gradually changing the current I. In any case, one cycle is divided by 6 states (state 1 to state 6) to show the relationship between FIG. 22 and FIG. 23.

Figure 23:
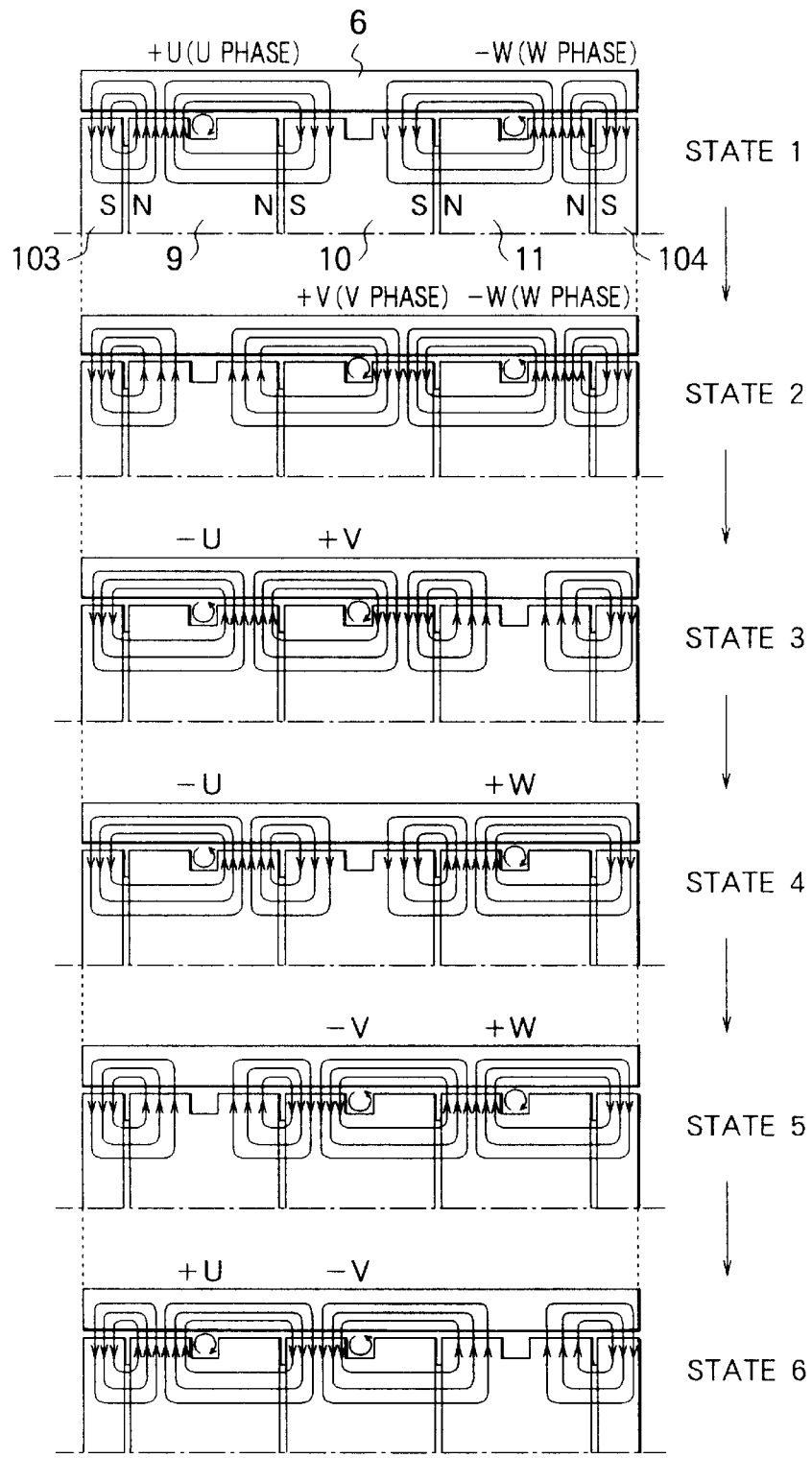
FIG. 23 is a view showing the driving states of the stepping motor in FIG. 19.

FIG. 23 shows synthesis of currents in the step driving states 1 to 6 and known magnetic fluxes generated by the auxiliary magnet plates 101 and 102 of the magnet plate 8 when the step driving in (A) and micro-step or sine-wave driving in (B) shown in FIG. 22 is performed.

In this case, FIG. 23 shows that the auxiliary magnetic plates 103 and 104 and the auxiliary magnet plates 101 and 102 according to the present invention are effectively and regularly operated for the synthetic distribution of all the magnetic fluxes.

Figure 24:
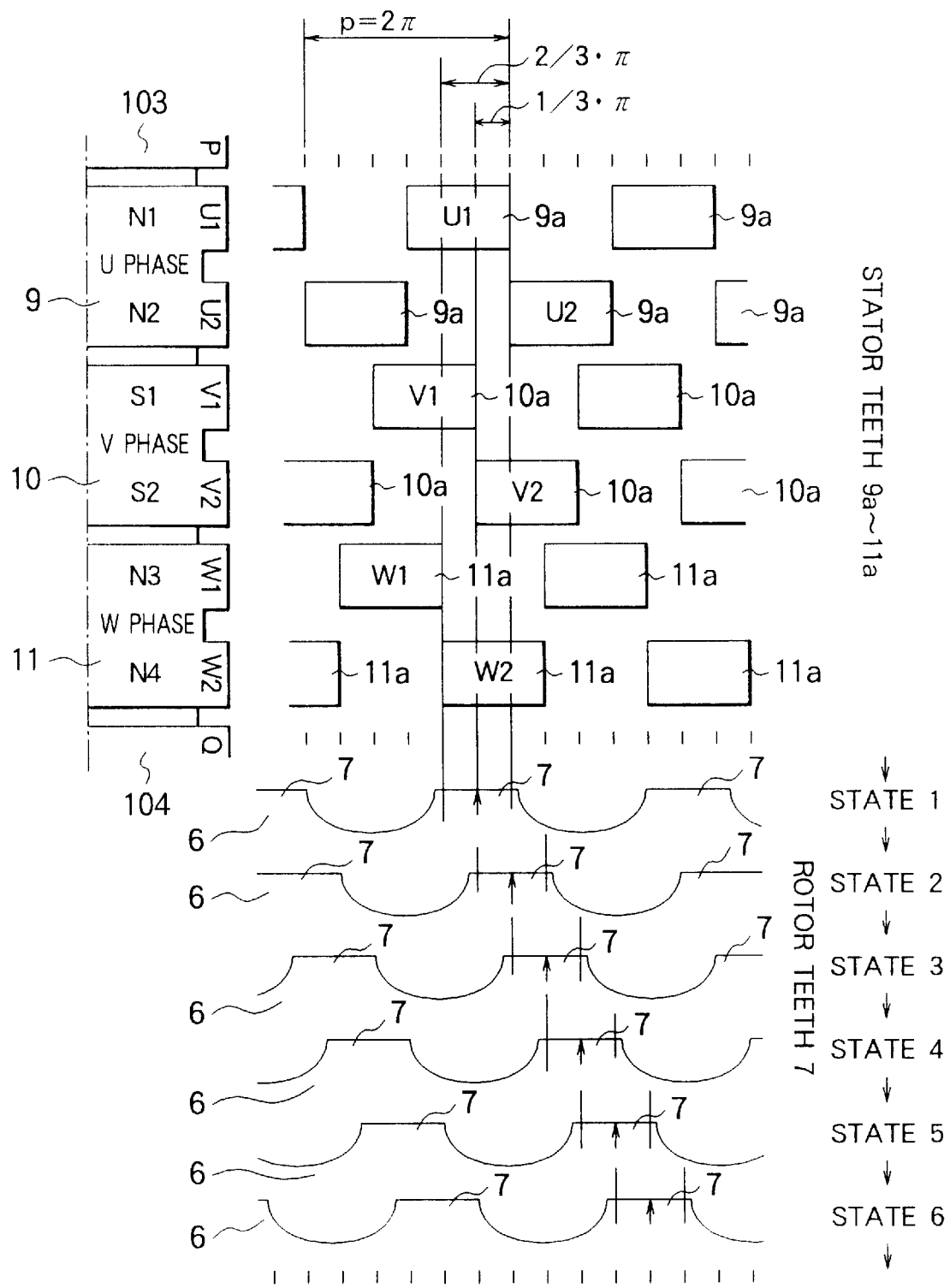
FIG. 24 is a view showing the driving states of the stepping motor in FIG. 19.

FIG. 24 shows overlapping between the stator teeth 9a, 10a, and 11a and the rotor teeth 7 in accordance with FIG. 23 described above, a changing state wherein the positions of the rotor and stator teeth are regularly moved in state 1 to state 6 described above, and a manner of the rotor teeth 7 which are sequentially pivoted. In this manner, a three-phase motor cannot achieve a function of a motor until the auxiliary magnetic plates 103 and 104 and the auxiliary magnet plates 101 and 102 are arranged on both the sides of the stator yoke member 100.

Figure 25:
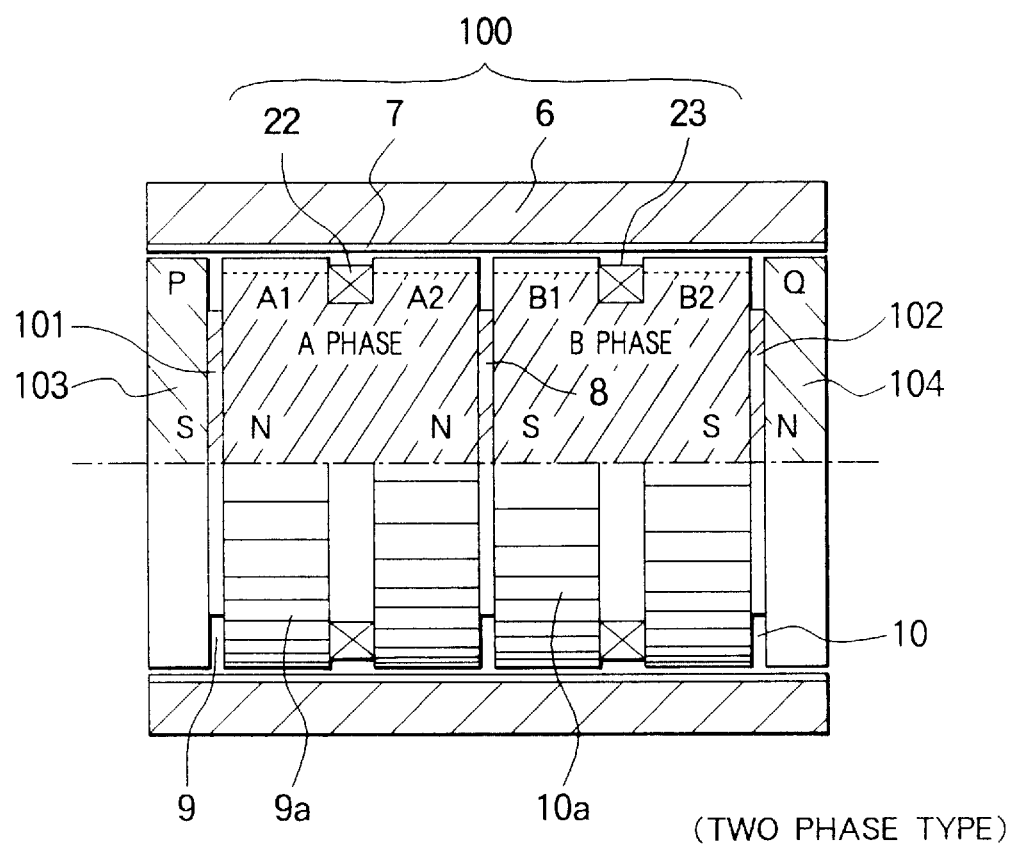
FIG. 25 is a half-sectional view showing a two-phase hybrid stepping motor according to the example in FIG. 19.

FIG. 25 shows a case wherein the arrangement shown in FIG. 19 is applied to a two-phase arrangement.

Teeth A1 and A2 and teeth B1 and B2 in the stator yokes 9 and 10 are shifted by ½ pitches, and the A phase and B phase serving as the stator yokes 9 and 10 are shifted by ½n pitches (n; 2 phases), i.e., ¼ pitches. In the two-phase arrangement, the motor can be established without arranging the auxiliary magnet plates 101 and 102 and the auxiliary magnetic plates 103 and 104. However, when the auxiliary magnet plates 101 and 102 and the auxiliary magnetic plates 103 and 104 are used as shown in FIG. 25 according to the present invention, the stator yokes 9 and 10 are strongly and uniformly magnetized from both the sides by the auxiliary magnet plates 101 and 102 to obtain a stronger output torque, and the torque can be suppressed from being unevenly generated.

Figure 26:
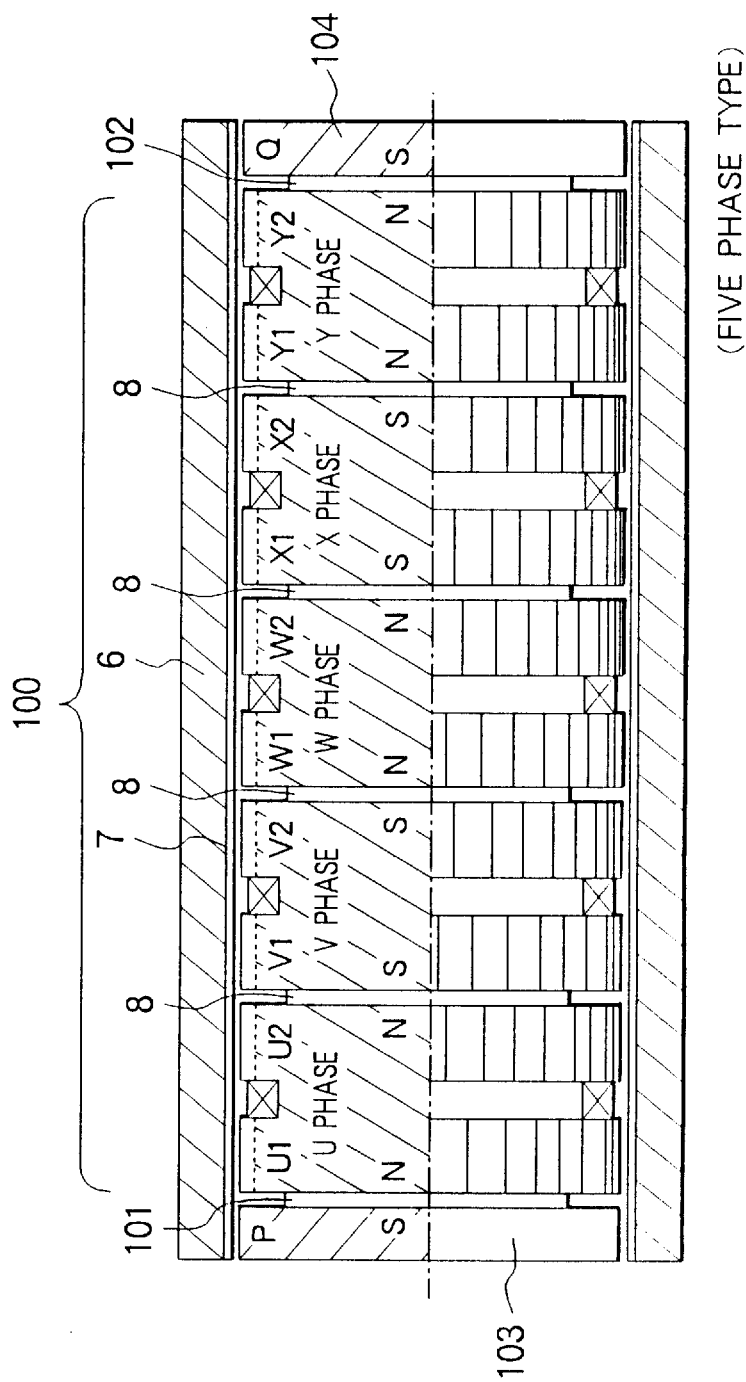
FIG. 26 is a half-sectional view showing a five-phase hybrid stepping motor according to the example in FIG. 19.

FIG. 26 shows a case wherein a five-phase arrangement is applied. Referring to FIG. 26, the same U-phase poles U1 and U2 are shifted by ½ pitches, the same V-phase poles V1 and V2 are shifted by ½ pitches, the same W-phase poles W1 and W2 are shifted by ½ pitches, the same X-phase poles X1 and X2 are shifted by ½ pitches, and the same Y-phase poles Y1 and Y2 are shifted by ½ pitches. The phases are shifted by (n=5) ½n=1/10 pitches.

As described above, as indicated by the arrangements shown in FIGS. 19 to 26, even in an odd-number-phase motor or an even-number-phase motor, two- or three- to n-phase arrangements can be realized.

Figure 27:
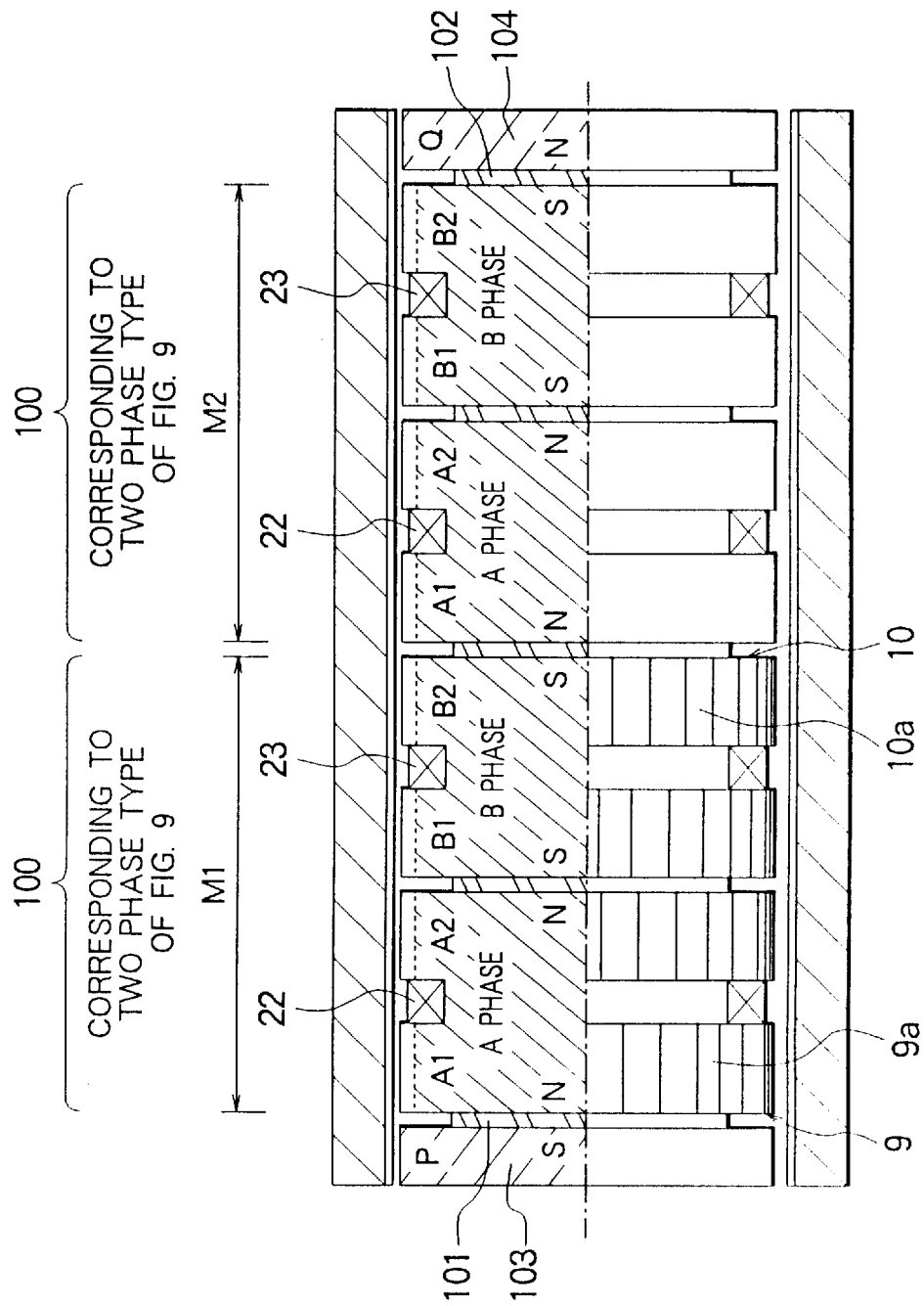
FIG. 27 is a half-sectional view showing an arrangement in which two two-phase hybrid stepping motors in FIG. 25 are connected in series with each other.

FIG. 27 shows a state wherein two motors each having the two-phase arrangement in FIG. 25 are connected in series with each other to obtain a cascade coupling (M1 and M2). More specifically, in the portions M1 and M2 in FIG. 27, two stator yoke members 100 shown in FIG. 25 are used, the magnet plates 8 are arranged between the stator yoke members 100, and other auxiliary magnet plates 101 and 102 and auxiliary magnetic plates 103 and 104 are arranged on both the ends of the arrangement as in FIG. 25. Therefore, when a plurality (N) of stator yoke members 100 are arranged, an outer-rotor-type hybrid stepping motor or an inner-rotor-type hybrid stepping motor which has an arbitrary number (N) of stator yokes 100 and a cascade coupling can be obtained. In this case, unlike in a case wherein the portions M1 and M2 are simply and independently arranged on one axis, the magnet plate 8 between the portions M1 and M2, the auxiliary magnet plates 101 and 102, and the auxiliary magnetic plates 103 and 104 effectively function as in the arrangement in FIG. 19.

FIG. 27 shows the two-phase arrangement motor in FIG. 25. Similarly, it is apparent that the above arrangement in FIG. 27 can be applied to the arrangements in FIG. 19 and 26, and can also be applied to the arrangement in FIG. 28 (to be described later). In general, when N n-phase motor portions are cascade-coupled to each other, a larger necessary torque can be obtained.

Figure 28:
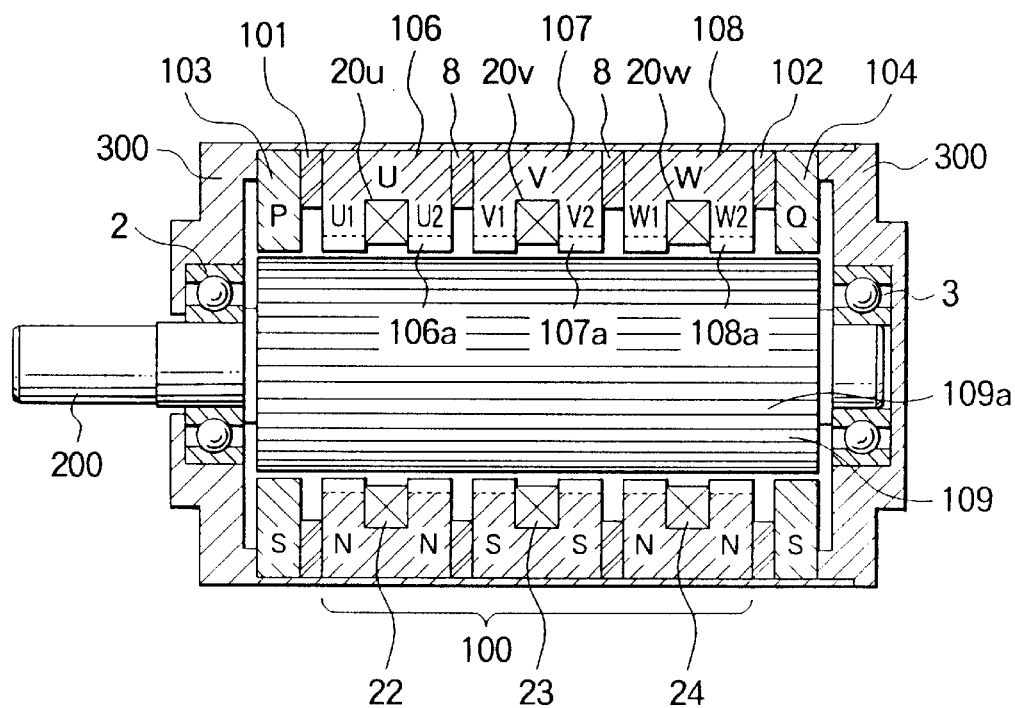
FIG. 28 is a sectional view showing another example of FIG. 19.

The arrangement shown in FIG. 28 shows a case wherein a hybrid stepping motor having a conventional inner-rotor arrangement shown in FIG. 1 is applied as in the arrangement of the present invention to constitute an inner-rotor-type hybrid stepping motor. First, second, and third annular stator yokes 106, 107, and 108 which are parallelly arranged in the axial direction through annular magnet plates 8 are integrally arranged on the inner surface of a stator case 300 to constitute a three-layered stator yoke member 100. The stator yokes 106, 107, and 108 are designed to have different polarities.

Auxiliary magnet plates 101 and 102 and auxiliary magnetic plates 103 and 104 are arranged on both the sides of the stator yoke member 100 to form magnetic circuits at both the end portions. First, second, and third bobbin-like coils 22, 23, and 24 are arranged in coil receiving grooves 20u, 20v, and 20w of the stator yokes 106, 107, and 108, respectively, a rotor yoke 109 corresponding to the three stator yokes 106, 107, and 108 is arranged on a rotating shaft 200 consisting of a magnetic material, and a plurality of rotor teeth 109a are formed on the outer peripheral surface of the rotor yoke 109. Therefore, the arrangement in FIG. 28 is of an inner-rotor type which is reverse to the type of the arrangement in FIG. 19. In the step driving states of the arrangement in FIG. 28, step rotation based on the same principle as that of the operations shown in FIGS. 20 to 24.

A two-phase inner-rotor-type motor and a five-phase inner-rotor-type motor shown in FIGS. 25 and 27 are formed in the same method as in FIG. 28. These motors are further generalized to obtain n-phase inner-rotor type motors.

As described above, n-phase inner-rotor-type motors obtained by generalizing the motor shown in FIG. 25 by cascade coupling are cascade-coupled to each other as shown in FIG. 27. Although the coils 22 and 23 are described on the assumption that known bipolar winding is used, even if known unipolar winding is used, the same effect as described above can be obtained. Although the motor is driven by one-phase magnetization as described above, the motor may be driven by 2-phase or 1-2-phase magnetization. Since the shifts in pitch among the teeth 7, 9a, 10a, 11a, and 109a are relative, when any teeth are shifted, the same operation as described above can be obtained. The shape of the motor can be arbitrarily set to be a flat and large-diameter shape, a thin shape, an very narrow shape, or the like. Therefore, when one or both of the annular rotor yoke 6 and the stator yokes 9, 10, and 11 shown in FIGS. 19 to 27 are partially or entirely constituted by a non-layered core, and one or both of the rotor yoke 109 and the annular stator yokes 106, 107, and 108 are partially or entirely constituted by the non-layered core, as in the case shown in FIG. 2, a magnetic resistance in the axial direction can be decreased, and the same preferable driving state as in FIG. 2 can be obtained.

As still another embodiment of the arrangement in FIG. 2, arrangements shown in FIGS. 29 to 38 can be used. The same reference numerals as in FIG. 2 denote the same parts in FIGS. 29 to 38.

Figure 29:
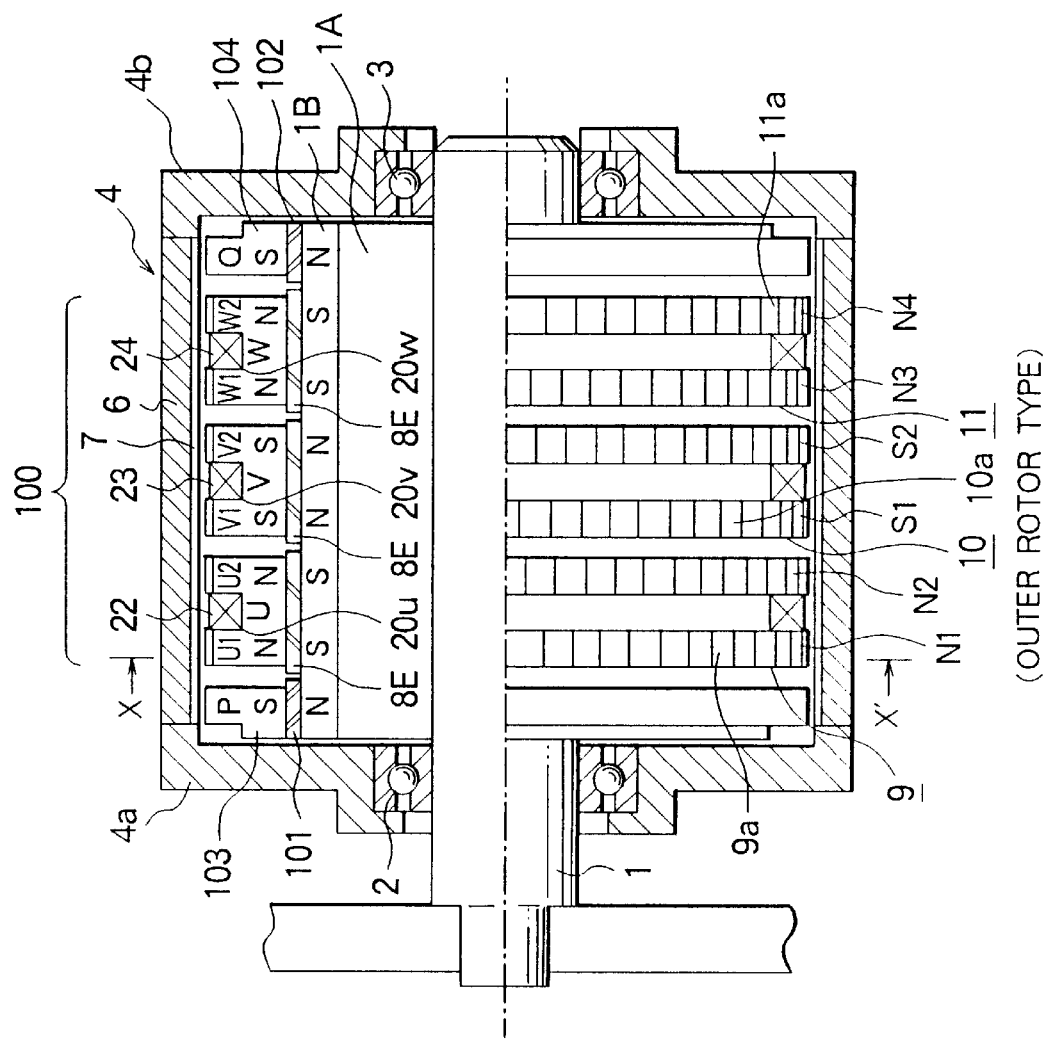
FIG. 29 is a half-sectional view showing still another example of FIG. 2.

FIG. 29 shows a hybrid stepping motor having an outer-rotor arrangement. Reference numeral 1 denotes a fixed shaft. A rotor case 4 constituted by a front lid 4a, a rear lid 4b, and a cylindrical rotor yoke 6 is rotatably arranged on bearings 2 and 3 spaced apart from the fixed shaft 1. A plurality of rotor teeth 7 are formed on the inner surface of the rotor yoke 6 of the rotor case 4.

First, second, and third annular stator yokes 9, 10, and 11 which are parallelly arranged in the axial direction through cylindrical magnet members 8E are arranged on a fixed shaft yoke 1B on the outer peripheral surface of a fixed shaft holding member 1A of the fixed shaft 1 such that the stator yokes 9, 10, and 11 are integrated with each other to interpose the cylindrical magnet members 8E in the radial direction. First, second, and third coil receiving grooves 20u, 20v, and 20w are formed at the central and outer peripheral positions of the stator yokes 9, 10, and 11 in the axial direction. The stator yokes 9 to 11 constitute a stator yoke member 100, and, on both the ends of the stator yoke member 100, first and second auxiliary magnetic plates 103 and 104 are fixed on the fixed shaft 1 through auxiliary magnet plates 101 and 102 arranged on both the sides of the magnet cylindrical members 8E. A first U-phase coil 22, a second V-phase coil 23, and a third W-phase coil 24 which are wound like bobbins are arranged in the coil receiving grooves 20u, 20v, and 20w, respectively (note that the coils 22, 23, and 24 are automatically wound from the outer peripheral side by a winding machine). First and second annular N-poles N1 and N2 are formed on the outer peripheral surface of the first stator yoke 9 to interpose the first coil 22, first and second annular S-poles S1 and S2 are formed on the outer peripheral surface of the second stator yoke 10 to interpose the second coil 23, and third and fourth annular N-poles N3 and N4 are formed on the outer peripheral surface of the third stator yoke 11 to interpose the third coil 24. The poles N1, N2, S1, S2, N3, and N4 correspond to the rotor teeth 7, respectively, and a plurality of stator teeth 9a, 10a, and 11a having the same pitch as that of the rotor teeth 7 are formed on the outer peripheral surfaces of the poles N1, N2, S1, S2, N3, and N4. As shown in the operation view in FIG. 34, the stator teeth 9a, 10a, and 11a are formed in the poles N1 and N2 such that the stator teeth 9a, 10a, and 11a are shifted from each other by ½ pitches (1π), the stator teeth 9a, 10a, and 11a are formed in the poles S1 and S2 such that the stator teeth 9a, 10a, and 11a are shifted from each other by ½ pitches (1π), and the stator teeth 9a, 10a, and 11a are formed in the poles N3 and N4 such that the stator teeth 9a, 10a, and 11a are shifted from each other by ½ pitches (1π). The stator teeth 9a, 10a, and 11a in the N-poles N1 and N2, the S-poles S1 and S2, and the N-poles N3 and N4 are formed to be shifted by ⅙ pitches ($\pi/3$) (½n pitches, n; the number of phases). The auxiliary magnetic plates 103 and 104 are only used to form magnetic flux paths.

Figure 30:
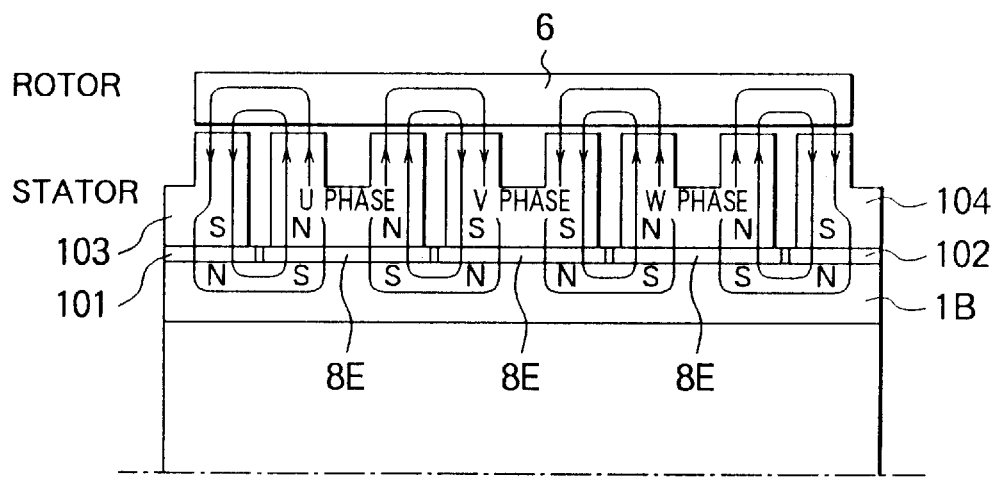
FIG. 30 is a view for explaining the flows of magnetic fluxes formed by the magnet plates in FIG. 29.
Figure 31:
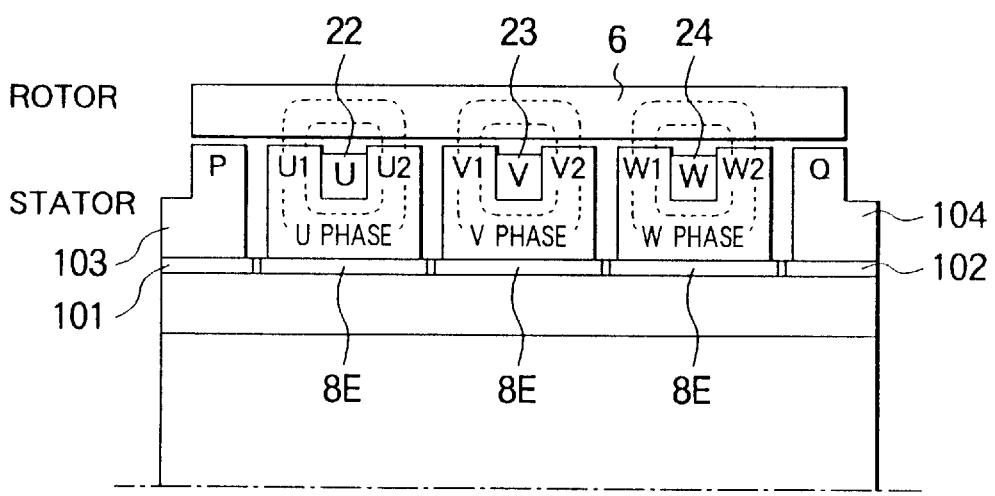
FIG. 31 is a view for explaining the flows of magnetic fluxes formed by the coils in FIG. 29.

An operation will be described below. FIG. 30 shows the flows of magnetic fluxes formed by the magnet cylindrical members 8E and the auxiliary magnet plates 101 and 102, and shows that the flows of the magnetic fluxes are equally divided by the first and second auxiliary magnetic plates 103 and 104. If there are no auxiliary magnet plates 101 and 102 and no auxiliary magnetic plates 103 and 104, the magnetic fluxes generated by the two magnets 8E are concentrated on the central V-phase stator yoke 10, and the magnetic fluxes are stronger (twice) than those of U and V phases on both the side of the stator yoke 10. For this reason, the strength of each phase becomes ununiform. As a result, the motor is not established. For this reason, the functions of the auxiliary magnet plates 101 and 102 and the auxiliary magnetic plates 103 and 104 are important. Therefore, magnetic paths are additionally formed to obtain the uniformity of the magnetic flux of each phase. FIG. 31 shows magnetic fluxes generated by the U-, V-, and W-phase coils 22, 23, and 24. The directions of the flows of the magnetic fluxes are dependent on the directions of currents flows in the coils 22, 23, and 24, respectively.

Figure 32:
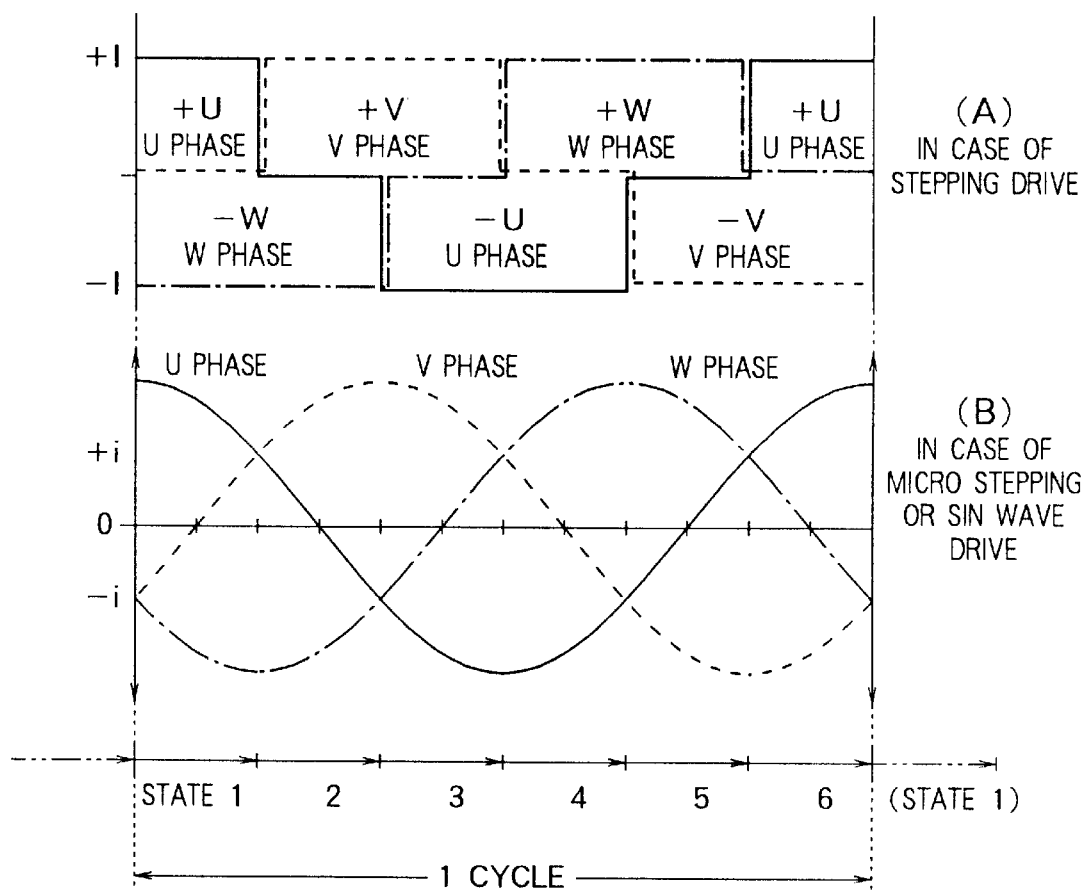
FIG. 32 is a view for explaining the driving states of the stepping motor in FIG. 29.

FIG. 32 shows a state wherein the coils 22, 23, and 24 are in an ON state. In FIG. 22, (A) shows step driving when the coils are turned on without changing the strength of a drive current I, and (B) shows known micro-step driving or sine-wave driving which is performed while gradually changing the current I. In any case, one cycle is divided by 6 states (state 1 to state 6) to show the relationship between FIG. 32 and FIG. 33.

Figure 33:
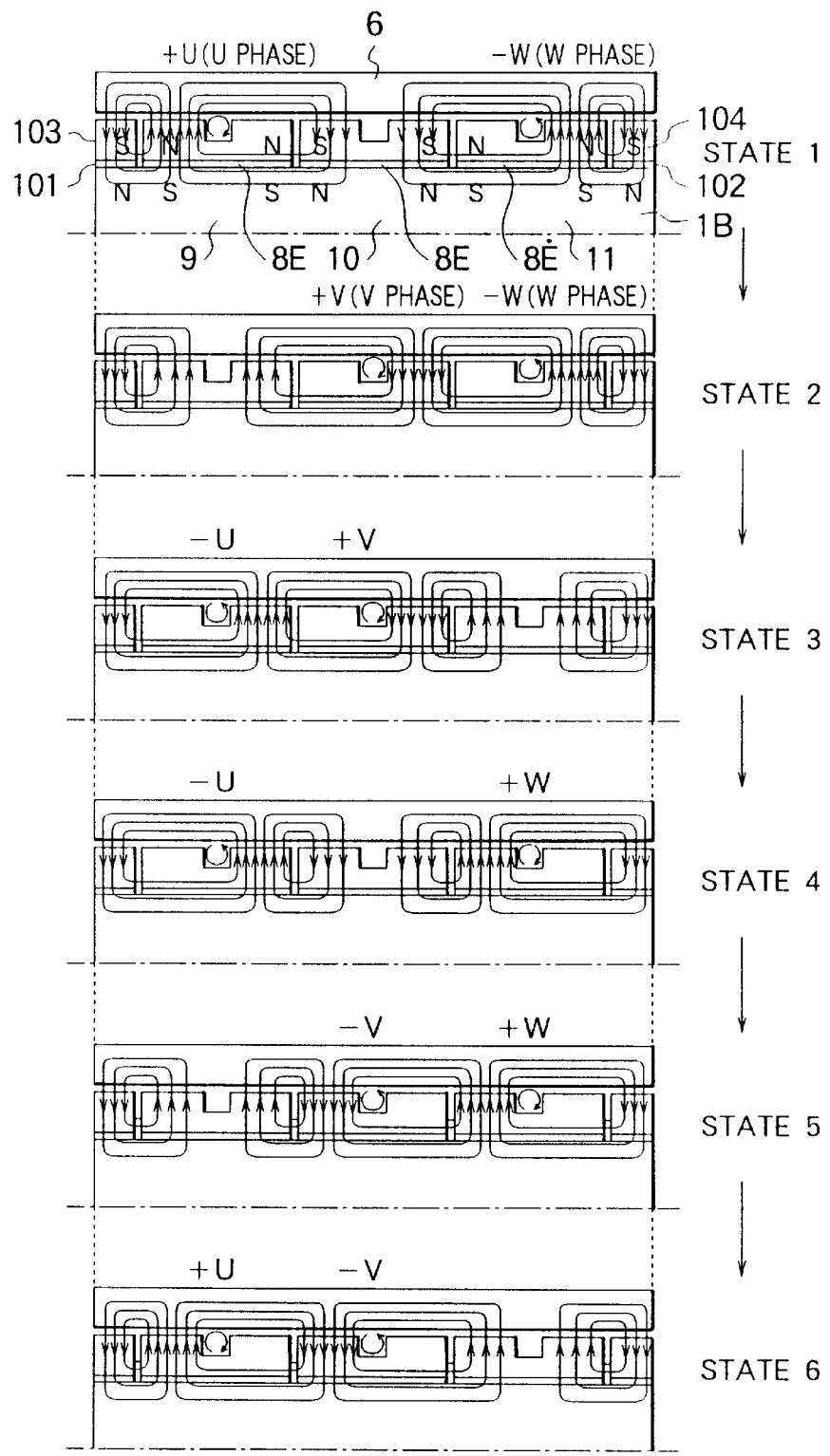
FIG. 33 is a view showing the driving states of the stepping motor in FIG. 29.

FIG. 33 shows synthesis of currents in the step driving states 1 to 6 and known magnetic fluxes generated by the auxiliary magnet plates 101 and 102 of the magnet plate 8 when the step driving in (A) and micro-step or sine-wave driving in (B) shown in FIG. 32 is performed.

In this case, FIG. 23 shows that the auxiliary magnetic plates 103 and 104 and the auxiliary magnet plates 101 and 102 according to the present invention are effectively and regularly operated for the synthetic distribution of all the magnetic fluxes.

Figure 34:
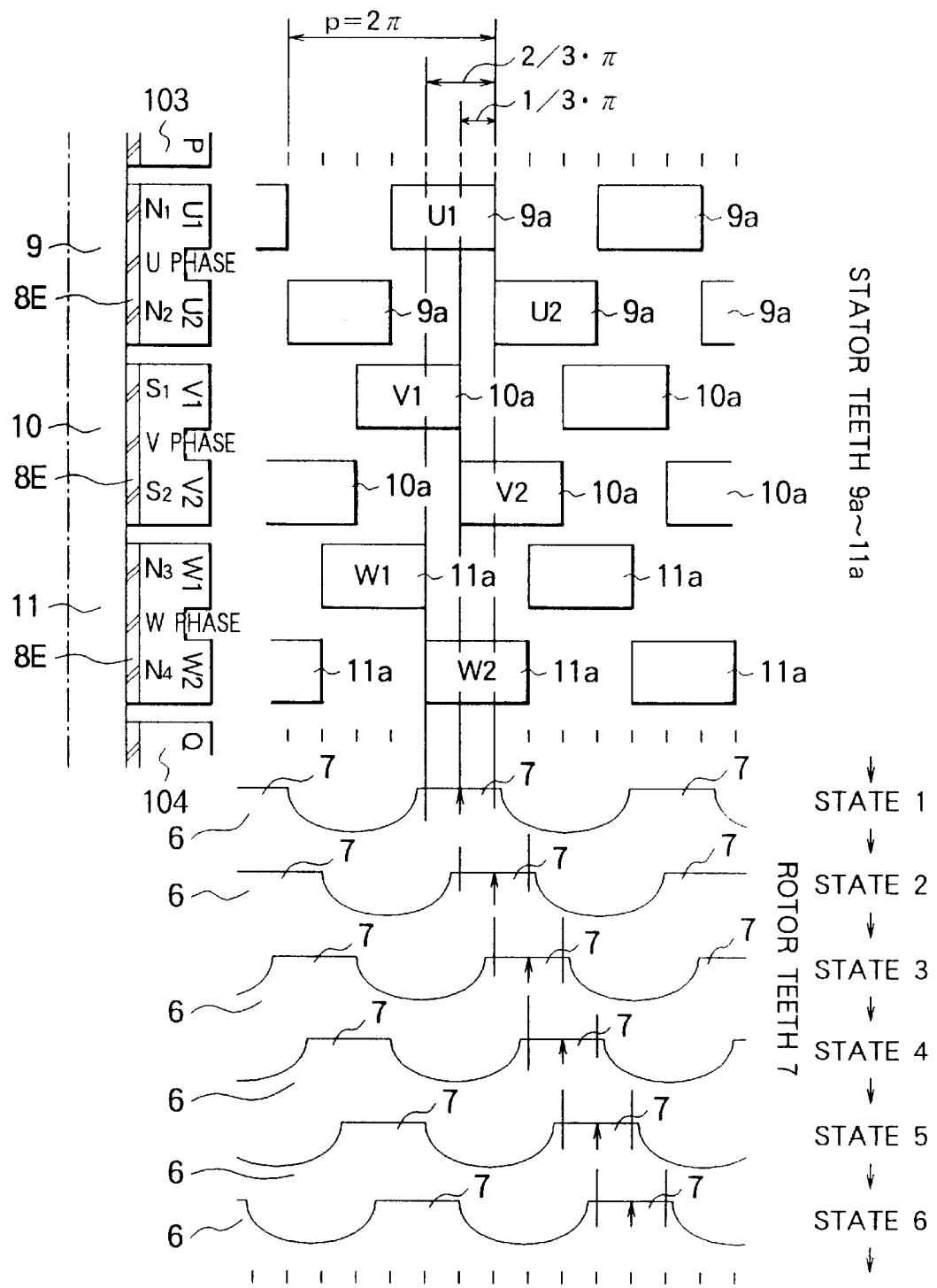
FIG. 34 is a view showing the driving states of the stepping motor in FIG. 29.

FIG. 34 shows overlapping between the stator teeth 9a, 10a, and 11a and the rotor teeth 7 in accordance with FIG. 33 described above, a changing state wherein the positions of the rotor and stator teeth are regularly moved in state 1 to state 6 described above, and a manner of the rotor teeth 7 which are sequentially pivoted. In this manner, a three-phase motor cannot achieve a function of a motor until the auxiliary magnetic plates 103 and 104 and the auxiliary magnet plates 101 and 102 are arranged on both the sides of the stator yoke member 100.

Figure 35:
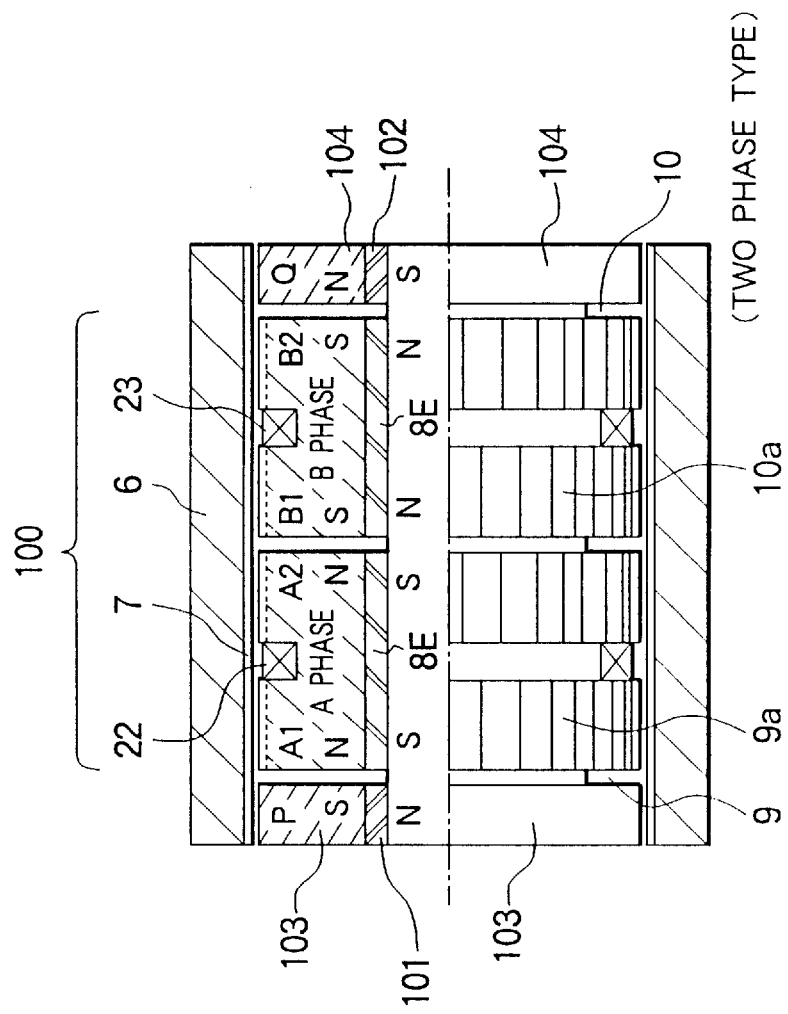
FIG. 35 is a half-sectional view showing a two-phase hybrid stepping motor according to the example in FIG. 29.

FIG. 35 shows a case wherein the arrangement shown in FIG. 29 is applied to a two-phase arrangement.

Teeth A1 and A2 and teeth B1 and B2 in the stator yokes 9 and 10 are shifted by ½ pitches, and the A phase and B phase serving as the stator yokes 9 and 10 are shifted by ½n pitches (n; 2 phases), i.e., ¼ pitches. In the two-phase arrangement, the motor can be established without arranging the auxiliary magnet plates 101 and 102 and the auxiliary magnetic plates 103 and 104. However, when the auxiliary magnet plates 101 and 102 and the auxiliary magnetic plates 103 and 104 are used as shown in FIG. 35 according to the present invention, the stator yokes 9 and 10 are strongly and uniformly magnetized from both the sides by the auxiliary magnet plates 101 and 102 to obtain a stronger output torque, and the torque can be suppressed from being unevenly generated.

Figure 36:
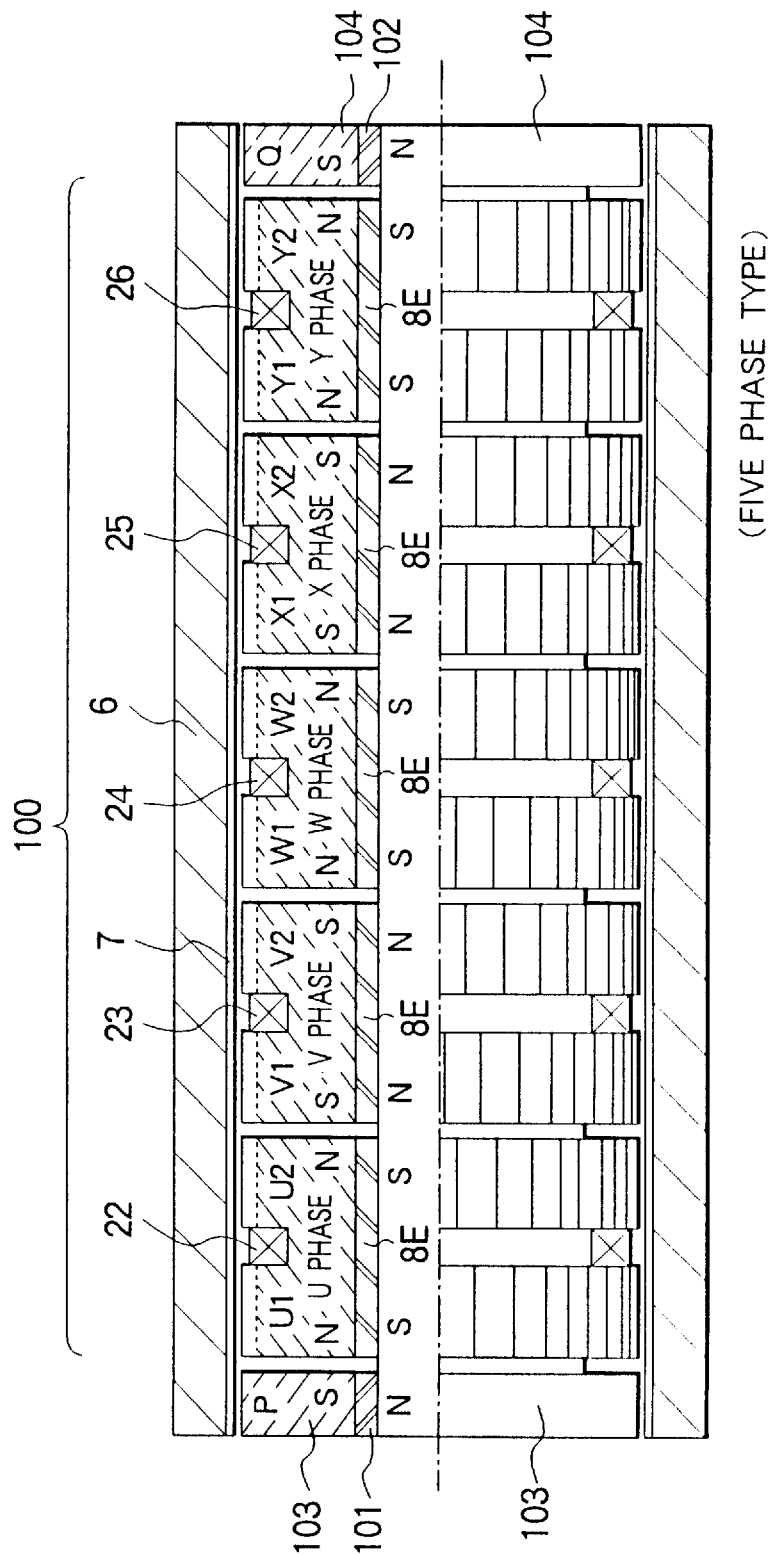
FIG. 36 is a half-sectional view showing a five-phase hybrid stepping motor according to the example in FIG. 29.

FIG. 36 shows a case wherein a five-phase arrangement is applied. The same U-phase poles U1 and U2 are shifted by ½ pitches, the same V-phase poles V1 and V2 are shifted by ½ pitches, the same W-phase poles W1 and W2 are shifted by ½ pitches, the same X-phase poles X1 and X2 are shifted by ½ pitches, and the same Y-phase poles Y1 and Y2 are shifted by ½ pitches. The phases are shifted by (n=5) ½n=1/10 pitches.

As described above, as indicated by the arrangements shown in FIGS. 29 to 36, even in an odd-number-phase motor or an even-number-phase motor, two- or three- to n (arbitrary-number)- phase arrangements can be realized.

Figure 37:
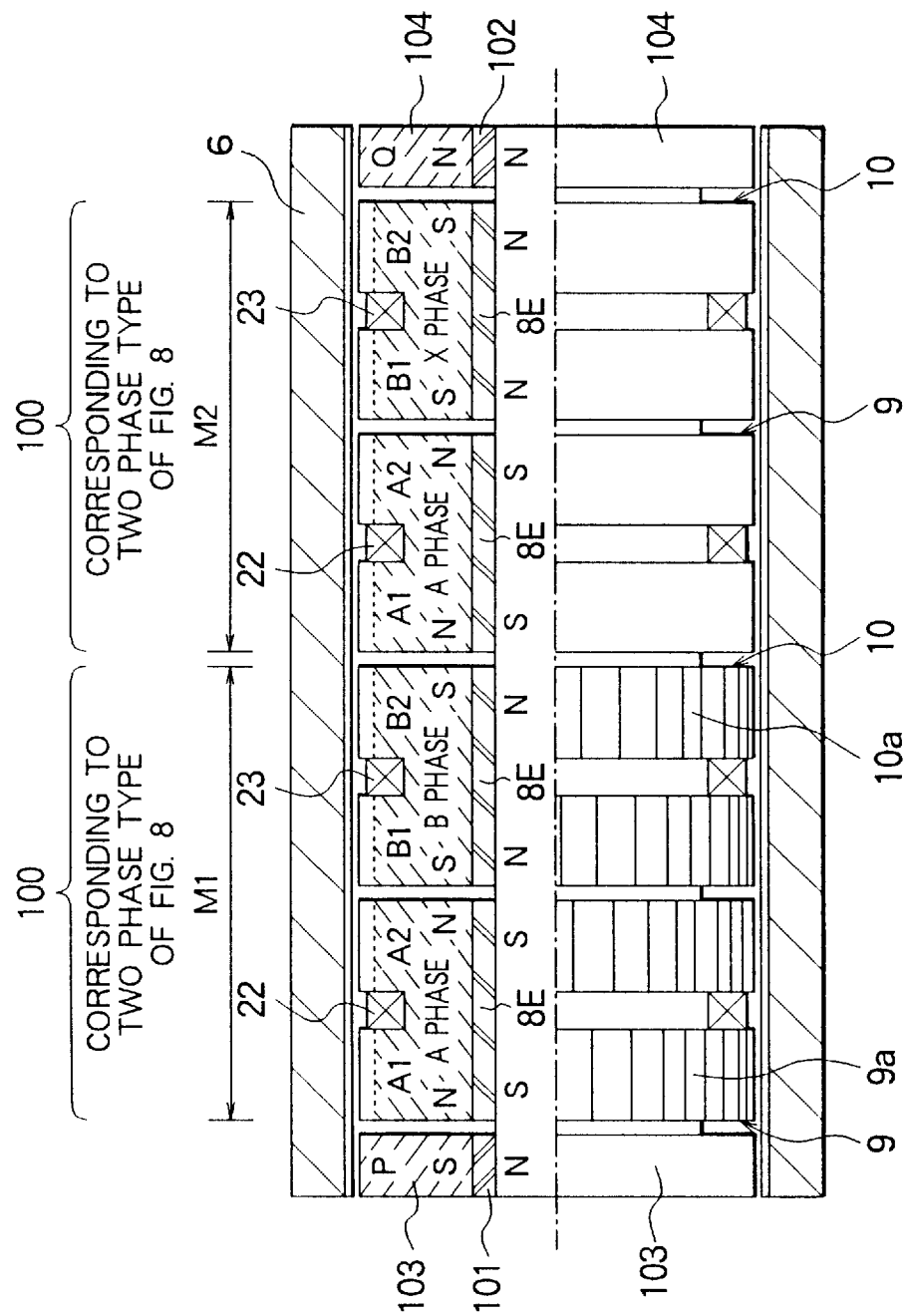
FIG. 37 is a half-sectional view showing an arrangement in which two two-phase hybrid stepping motors in FIG. 35 are connected in series with each other.

FIG. 37 shows a state wherein two motors each having the two-phase arrangement in FIG. 35 are connected in series with each other to obtain a cascade coupling (M1 and M2). More specifically, in the portions M1 and M2 in FIG. 37, two stator yoke members 100 shown in FIG. 35 are used, the magnet cylindrical members 8E are arranged in the stator yoke members 100, and other auxiliary magnet plates 101 and 102 and auxiliary magnetic plates 103 and 104 are arranged on both the ends of the arrangement as in FIG. 35. Therefore, when a plurality (N) of stator yoke members 100 are arranged, an outer-rotor-type hybrid stepping motor or an inner-rotor-type hybrid stepping motor which has an arbitrary number (N) of stator yokes 100 and a cascade coupling can be obtained. In this case, unlike in a case wherein the portions M1 and M2 are simply and independently arranged on one axis, the magnetic path is formed between the portion M1 and the portion M2, and the auxiliary magnet plates 101 and 102 and the auxiliary magnetic plates 103 and 104 effectively function as in the arrangement in FIG. 29.

FIG. 37 shows the two-phase arrangement motor in FIG. 35. Similarly, it is apparent that the above arrangement in FIG. 37 can be applied to the arrangements in FIG. 29 and 36, and can also be applied to the arrangement in FIG. 38 (to be described later). In general, when N n-phase motor portions are cascade-coupled to each other, a larger necessary torque can be obtained.

Figure 38:
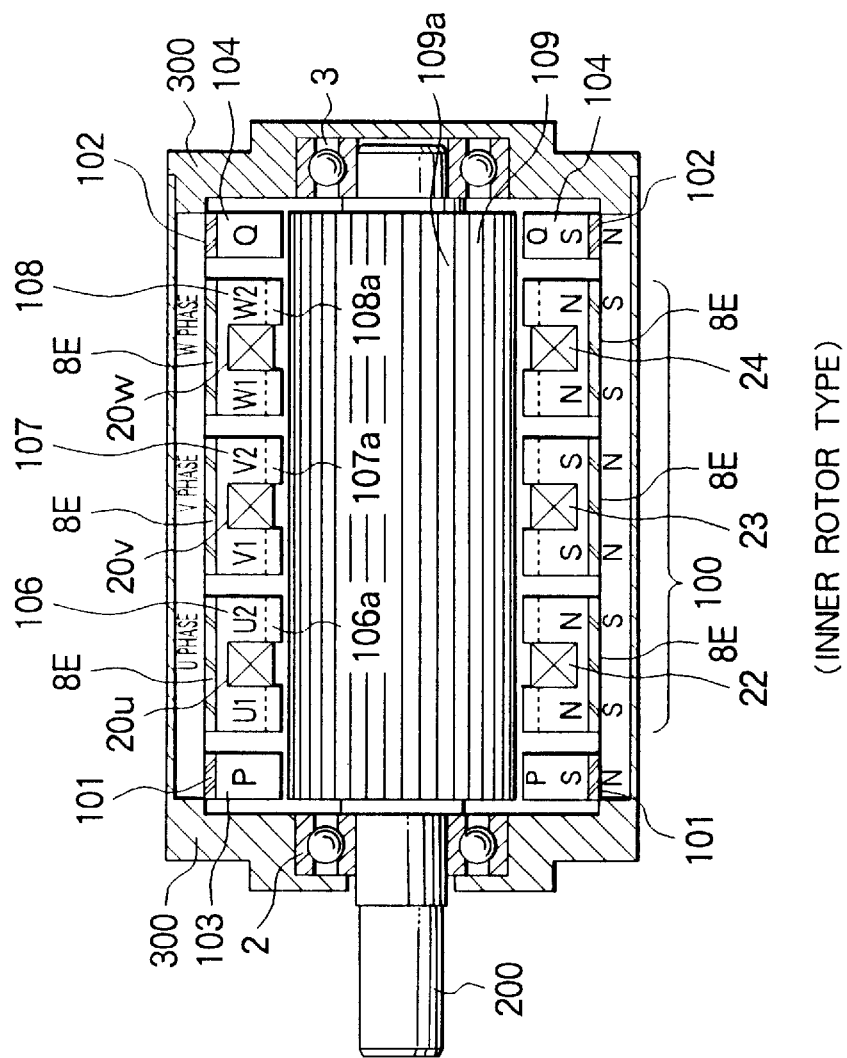
FIG. 38 is a sectional view showing another example of FIG. 29.

The arrangement shown in FIG. 38 shows a case wherein a hybrid stepping motor having a conventional inner-rotor arrangement shown in FIG. 1 is applied as in the arrangement of the present invention to constitute an inner-rotor-type hybrid stepping motor. First, second, and third annular stator yokes 106, 107, and 108 which are parallelly arranged in the axial direction through annular magnet cylindrical members 8E are integrally arranged on the inner surface of a stator case 300 to constitute a three-layered stator yoke member 100. The stator yokes 106, 107, and 108 are designed to have different polarities.

Auxiliary magnet plates 101 and 102 and auxiliary magnetic plates 103 and 104 are arranged on both the sides of the stator yoke member 100 to form magnetic circuits at both the end portions. First, second, and third bobbin-like coils 22, 23, and 24 are arranged in coil receiving grooves 20u, 20v, and 20w of the stator yokes 106, 107, and 108, respectively, a longitudinal rotor yoke 109 corresponding to the three stator yokes 106, 107, and 108 is arranged on a rotating shaft 200 consisting of a magnetic material, and a plurality of rotor teeth 109a are formed on the outer peripheral surface of the rotor yoke 109. Therefore, the arrangement in FIG. 38 is of an inner-rotor type which is reverse to the type of the arrangement in FIG. 29. In the step driving states of the arrangement in FIG. 38, step rotation based on the same principle as that of the operations shown in FIGS. 30 to 34.

A two-phase inner-rotor-type motor and a five-phase inner-rotor-type motor shown in FIGS. 35 and 37 are formed in the same method as in FIG. 38. These motors are further generalized to obtain n-phase inner-rotor type motors.

As described above, n-phase inner-rotor-type motors obtained by generalizing the motor shown in FIG. 35 by cascade coupling are cascade-coupled to each other as shown in FIG. 37. Although the coils 22 and 23 are described on the assumption that known bipolar winding is used, even if known unipolar winding is used, the same effect as described above can be obtained. Although the motor is driven by one-phase magnetization as described above, the motor may be driven by 2-phase or 1-2-phase magnetization. Since the shifts in pitch among the teeth 7, 9a, 10a, 11a, and 109a are relative, when any teeth are shifted, the same operation as described above can be obtained. The shape of the motor can be arbitrarily set to be a flat and large-diameter shape, a thin shape, an very narrow shape, or the like. Although the magnet cylindrical members 8E are independently arranged for the phases, respectively, even if the magnet cylindrical members of the phases constitute an integrated cylinder to obtain magnetization, the same effect as described above can be obtained.

Therefore, when one or both of the annular rotor yoke 6 and the stator yokes 9, 10, and 11 shown in FIGS. 29 to 37 are partially or entirely constituted by a non-layered core, and one or both of the rotor yoke 109 and the annular stator yokes 106, 107, and 108 of FIG. 38 are partially or entirely constituted by the non-layered core, as in the case shown in FIG. 2, a magnetic resistance in the axial direction can be obtained, and the same preferable driving state as in FIG. 2 can be obtained.

Since a hybrid stepping motor according to the present invention is constituted as described above, the following effects can be obtained. More specifically, according to the arrangement shown in FIG. 2, since a coil is arranged on the outer peripheral surface of a stator yoke, a winding operation can be very easily performed, and costs of an outer-rotor-type hybrid stepping motor of this type can be considerably reduced. In the arrangement in FIG. 7, a coil formed like a bobbin can be inserted from the inside of a stator yoke, and an assembly cost can be considerably reduced. In addition, since auxiliary magnet cylindrical members serving as magnetic flux paths are arranged on both the sides of a motor, magnetic poles can be formed on both the sides of the magnet cylindrical members, a large torque can be easily obtained. Therefore, an n-phase stepping motor can be obtained as needed.

In an n-phase motor, stator yokes are satisfactorily shifted from each other by only ½n pitches. The stators and stator yokes need not be changed in a 2- to n-phase motor. Outer-rotor-type and inner-rotor-type hybrid stepping motors each having N stator yoke members can be obtained. Since one or both of a rotor portion and a stator portion are partially or entirely constituted by a non-layered core, a detente torque in an ON state can be decreased, and the difference between torques generated by magnetized phases can be decreased. Therefore, a torque-increase-type motor which has preferable torque/current characteristics and is preferably driven in an ON state can be obtained.

What is claimed is:

1. A hybrid stepping motor comprising: a pair of bearings arranged to be spaced apart from a fixed shaft; a rotor case rotatably arranged through said bearings; an annular rotor yoke arranged on an inner surface of said rotor case and having a plurality of rotor teeth; first and second stator yokes parallelly arranged on said fixed shaft in an axial direction and separated by a magnet plate; a plurality of stator teeth formed on outer peripheral surfaces of said stator yokes; first and second coil receiving grooves respectively formed at an axially central position at an outer periphery of each of said stator yokes; and first and second coils respectively arranged in said first and second coil receiving grooves, wherein said stator yokes are designed to have different polarities, and at least on of said annular rotor yoke and said stator yokes has a portion constituted by a non-layered core.

2. A hybrid stepping motor comprising: a pair of bearings arranged at both the ends of a casing; a rotating shaft rotatably arranged through said bearings; first and second annular stator yokes parallelly arranged on an inner surface of said casing in an axial direction and separated by an annular magnet plate; a plurality of stator teeth formed on inner surfaces of said annular stator yokes; first and second coil receiving grooves formed at an axillary central position at an inner periphery of each of said stator yokes; first and second coils respectively arranged in said coil receiving grooves, a rotor yoke arranged on said rotating shaft and located in correspondence with said stator yokes; and a plurality of rotor teeth formed on an outer peripheral surface of said rotor yoke, wherein at least one of said annular stator yokes and said rotor yoke has a portion constituted by a non-layered core.

3. A hybrid stepping motor comprising: a pair of bearings arranged to be spaced apart from a fixed shaft; a rotor case rotatably arranged through said bearings; an annular rotor yoke arranged on an inner surface of said rotor case and having a plurality of rotor teeth; a cylindrical magnet member arranged on an outer peripheral surface of said fixed shaft; a pair of first and second annular stator yokes arranged to be fitted on an outer peripheral surface of said cylindrical magnet member, a plurality of stator teeth formed on outer peripheral surfaces of said stator yokes; first and second coil receiving grooves formed at an axially central position at an outer periphery of each of said annular stator yokes in an axial direction; and first and second coils respectively arranged in said coil receiving grooves, wherein said annular stator yokes are designed to have different polarities, and at least one of said annular rotor yoke and said annular stator yokes has a portion constituted by a non-layered core.

4. A hybrid stepping motor according to claim 3, characterized in that a void is formed between said annular stator yokes.

5. A hybrid stepping motor comprising: a bearing arranged on a fixed shaft; a cylindrical rotor rotatably arranged through said bearing; a plurality of rotor teeth formed on inner and outer peripheral surfaces of said cylindrical rotor; first and second inner stator yokes and first and second outer stator yokes parallelly arranged on said fixed shaft in an axial direction and separated by a magnet plate; a plurality of stator yoke teeth formed on said stator yokes; a first to fourth coil receiving grooves formed at axially central positions of said inner and outer stator yokes toward said cylindrical rotor; and first to fourth coils which are respectively arranged in said coil receiving grooves and bobbin-wound, wherein said stator yokes are designed to have different polarities, said coils arranged to interpose said cylindrical rotor, and at least one of said cylindrical rotor and said stator yokes has a portion constituted by a non-layered core.

6. A hybrid stepping motor according to claim 5, wherein said magnet plate is constituted by first and second magnets respectively arranged between said inner stator yokes and between said outer stator yokes.

7. A hybrid stepping motor according to claim 5, characterized in that said magnet plate is constituted by first and second magnets arranged between said inner stator yokes and said fixed shaft and between said outer stator yokes and an outer wall of said fixed shaft, and said magnets oppose each other through said cylindrical rotor.

8. A hybrid stepping motor which is of an outer-rotor type, comprising: a pair of bearings arranged to be spaced apart from a fixed shaft; a rotor case rotatably arranged through said bearings; an annular rotor yoke arranged in said rotor case and having a plurality of rotor teeth; a stator yoke member constituted by n stator yokes parallelly arranged on said fixed shaft in an axial direction and separated by a magnet plate; a plurality of stator teeth formed on an outer peripheral surface of said stator yokes; n coil receiving grooves respectively formed at an axially central position at an outer periphery of each of said stator yokes; n coils respectively arranged in said coil receiving grooves; and a pair of auxiliary magnetic plates arranged at each of the ends of said stator yoke member on said fixed shaft, each said auxiliary magnetic plate being separated from said stator yokes by an auxiliary magnet plate; wherein said stator yokes form polarities which are different from each other, a magnetic flux generated by said auxiliary magnet plates passes through said auxiliary magnetic plates, and at least one of said annular rotor yoke and said stator yokes has a portion constituted by a non-layered core.

9. A hybrid stepping motor according to claim 8, characterized in that said stator yokes comprise three stator yokes, and are designed to be three-phase-driven.

10. A hybrid stepping motor according to claim 8, characterized in that said stator yokes comprise two stator yokes, and are designed to be two-phase-driven.

11. A hybrid stepping motor which is of an inner-rotor type, comprising: a pair of bearings arranged at both the ends of a casing; a rotating shaft rotatably arranged through said bearings; a stator yoke member constituted by n annular stator yokes parallelly arranged on an inner surface of said casing in an axial direction and separated by an annular magnet plate; a plurality of stator teeth formed on an inner peripheral surface of said annular stator yokes; a pair of auxiliary magnetic-plates positioned at both the ends of said stator yoke member each said auxiliary magnet plate being separated from said stator yoke by an auxiliary magnet plate; n coil receiving grooves respectively formed at an axially central position at an inner periphery of each said annular stator yokes; n coils respectively arranged in said coil receiving grooves; a rotor yoke arranged on said rotating shaft and located in correspondence with said stator yokes; and a plurality of rotor teeth arranged on an outer peripheral surface of said rotor yoke, wherein a magnetic flux generated by said auxiliary magnet plates passes through said auxiliary magnetic plates, and at least one of said annular stator yokes and said rotor yoke has a potion constituted by a non-layered core.

12. A hybrid stepping motor according to claim 11, characterized in that said annular stator yokes comprise three annular stator yokes, and are designed to be three-phase-driven.

13. A hybrid stepping motor according to claim 11, characterized in that said annular stator yokes comprise two annular stator yokes, and are designed to be two-phase-driven.

14. A hybrid stepping motor which is of an outer-rotor type according to claim 8, wherein said stator yoke member comprises a plurality of stator yoke members arranged through said magnet plate, and the number of said stator yoke members is N.

15. A hybrid stepping motor which is of an outer-rotor type according to claim 9, characterized in that said stator yoke member comprises a plurality of stator yoke members arranged through said magnet plate, and the number of said stator yoke members is N.

16. A hybrid stepping motor which is of an outer-rotor type according to claim 10, characterized in that said stator yoke member comprises a plurality of stator yoke members arranged through said magnet plate, and the number of said stator yoke members is N.

17. A hybrid stepping motor which is of an inner-rotor type according to claim 11, characterized in that said stator yoke member comprises a plurality of stator yoke members arranged through said magnet plate, and the number of said stator yoke members is N.

18. A hybrid stepping motor which is of an inner-rotor type according to claim 12, characterized in that said stator yoke member comprises a plurality of stator yoke members arranged through said magnet plate, and the number of said stator yoke members is N.

19. A hybrid stepping motor which is of an inner-rotor type according to claim 13, characterized in that said stator yoke member comprises a plurality of stator yoke members arranged through said magnet plate, and the number of said stator yoke members is N.

20. A hybrid stepping motor which is of an outer-rotor type, comprising: a pair of bearings arranged to be spaced apart from a fixed shaft; a rotor case rotatably arranged through said bearings; an annular rotor yoke arranged in said rotor case and having a plurality of rotor teeth; a stator yoke member constituted by n stator yokes parallelly arranged on said fixed shaft in an axial direction and separated from said fixed shaft by a cylindrical magnet member; a plurality of stator teeth formed on an outer peripheral surface of said stator yokes; n coil receiving grooves formed at an axially central position at an outer periphery of each of said stator yokes; n coils respectively arranged in said coil receiving grooves; and a pair of auxiliary magnetic plates arranged at each of the ends of said stator yoke member on said fixed shaft and separating said fixed shaft from a respective end of said stator yoke member; wherein said stator yokes alternately form polarities which are different from each other, a magnetic flux generated by said auxiliary magnet plates passes through said auxiliary magnetic plates, and at least one of said annular rotor yokes and said stator yokes has a portion constituted by a non-layered core.

21. A hybrid stepping motor according to claim 20, characterized in that said stator yokes comprise three stator yokes, and are designed to be three-phase-driven.

22. A hybrid stepping motor according to claim 20, characterized in that said stator yokes comprise two stator yokes, and are designed to be two-phase-driven.

23. A hybrid stepping motor which is of an inner-rotor type, comprising: a pair of bearings arranged at both the ends of a casing; a rotating shaft rotatably arranged through said bearings; a stator yoke member constituted by n annular stator yokes parallelly arranged on an inner surface of said casing in an axial direction and separated by an annular cylindrical member; a plurality of stator teeth formed on an inner peripheral surface of said annular stator yokes; a respective auxiliary cylindrical magnet positioned at each of the ends of said stator yoke member and separating a respective one of the ends of said casing from said stator yoke member; n coil receiving grooves respectively formed at an axially central position at an inner periphery of each of said annular stator yokes; n coils respectively arranged in said coil receiving grooves; a rotor yoke arranged on said rotating shaft and located in correspondence with said stator yokes; and a plurality of rotor teeth arranged on an outer peripheral surface of said rotor yoke, wherein a magnetic flux generated by said auxiliary cylindrical magnet members passes through said auxiliary cylindrical magnet members, and at least one of said annular stator yokes and said rotor yoke has a portion constituted by a non-layered core.

24. A hybrid stepping motor according to claim 23, characterized in that said annular stator yokes comprise three annular stator yokes, and are designed to be three-phase-driven.

25. A hybrid stepping motor according to claim 23, characterized in that said annular stator yokes comprise two annular stator yokes, and are designed to be two-phase-driven.

26. A hybrid stepping motor which is of an outer-rotor type according to claim 20, characterized in that said stator yoke member comprises a plurality of stator yoke members arranged through said magnet cylindrical member, and the number of said stator yoke members is N.

27. A hybrid stepping motor which is of an outer-rotor type according to claim 21, characterized in that said stator yoke member comprises a plurality of stator yoke members arranged through said magnet cylindrical member, and the number of said stator yoke members is N.

28. A hybrid stepping motor which is of an outer-rotor type according to claim 22, characterized in that said stator yoke member comprises a plurality of stator yoke members arranged through said magnet cylindrical member, and the number of said stator yoke members is N.

29. A hybrid stepping motor which is of an inner-rotor type according to claim 23, characterized in that said stator yoke member comprises a plurality of stator yoke members arranged through said magnet cylindrical member, and the number of said stator yoke members is N.

30. A hybrid stepping motor which is of an inner-rotor type according to claim 24, characterized in that said stator yoke member comprises a plurality of stator yoke members arranged through said magnet cylindrical member, and the number of said stator yoke members is N.

31. A hybrid stepping motor which is of an inner-rotor type according to claim 25, characterized in that said stator yoke member comprises a plurality of stator yoke members arranged through said magnet cylindrical member, and the number of said stator yoke members is N.

* * * * *